United States Patent
Saito et al.

(10) Patent No.: US 10,194,103 B2
(45) Date of Patent: Jan. 29, 2019

(54) SOLID-STATE IMAGING DEVICE AND METHOD OF DRIVING SOLID-STATE IMAGING DEVICE WITH CLIPPING LEVEL SET ACCORDING TO TRANSFER OPERATION FREQUENCY

(71) Applicant: CANON KABUSHIKI KAISHA, Tokyo (JP)

(72) Inventors: Kazuhiro Saito, Tokyo (JP); Daisuke Kobayashi, Kawaguchi (JP); Toru Koizumi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/674,285

(22) Filed: Aug. 10, 2017

(65) Prior Publication Data
US 2018/0084206 A1  Mar. 22, 2018

(30) Foreign Application Priority Data
Sep. 16, 2016  (JP) .................................. 2016-181283

(51) Int. Cl.
*H04N 5/359*  (2011.01)
*H04N 5/355*  (2011.01)
(Continued)

(52) U.S. Cl.
CPC ........... *H04N 5/359* (2013.01); *H04N 5/3559* (2013.01); *H04N 5/35572* (2013.01);
(Continued)

(58) Field of Classification Search
CPC .. H04N 5/359; H04N 5/35572; H04N 5/3559; H04N 5/37452; H04N 5/37457; H04N 5/378
See application file for complete search history.

(56) References Cited

U.S. PATENT DOCUMENTS 5,698,892 A  12/1997 Koizumi et al. .............. 257/620
6,188,094 B1  2/2001 Kochi et al. .................. 257/232
(Continued)

FOREIGN PATENT DOCUMENTS

JP  2015-177350  10/2015

OTHER PUBLICATIONS

U.S. Appl. No. 15/630,013, filed Jun. 22, 2017.
U.S. Appl. No. 15/620,972, filed Jun. 13, 2017.
U.S. Appl. No. 15/712,611, filed Sep. 22, 2017.

*Primary Examiner* — Nicholas G Giles
(74) *Attorney, Agent, or Firm* — Venable, LLP

(57) ABSTRACT

A solid-state imaging device includes pixels including a photoelectric converter, a holding portion, and a transfer unit transferring charges from the photoelectric converter to the holding portion, and outputting a signal based on charges held in the holding portion, a signal line the signal is output from the pixels, a clipping unit limiting signal level so that it falls within a range having an upper limit or a lower limit determined by a clipping level, a transfer control unit controlling the transfer unit so that the charges generated during one exposure period are transferred through transfer operation performed at frequency variable but at least once, and a clipping level control unit controlling so that the clipping level is set to first clipping level when the transfer operation is performed at first frequency, and is set to second clipping level when the transfer operation is performed at second frequency.

19 Claims, 17 Drawing Sheets

(51) Int. Cl.
*H04N 5/3745* (2011.01)
*H04N 5/378* (2011.01)

(52) U.S. Cl.
CPC ......... *H04N 5/378* (2013.01); *H04N 5/37452* (2013.01); *H04N 5/37457* (2013.01)

(56) References Cited

U.S. PATENT DOCUMENTS

| | | | |
|---|---|---|---|
| 6,605,850 B1 | 8/2003 | Kochi et al. ................... 257/431 |
| 6,670,990 B1 | 12/2003 | Kochi et al. ................... 348/310 |
| 6,946,637 B2 | 9/2005 | Kochi et al. ............... 250/208.1 |
| 6,960,751 B2 | 11/2005 | Hiyama et al. ............ 250/208.1 |
| 7,016,089 B2 | 3/2006 | Yoneda et al. ................ 358/482 |
| 7,110,030 B1 | 9/2006 | Kochi et al. ................... 348/308 |
| 7,227,208 B2 | 6/2007 | Ogura et al. .................. 257/292 |
| 7,321,110 B2 | 1/2008 | Okita et al. ............... 250/208.1 |
| 7,324,144 B1 | 1/2008 | Koizumi ........................ 348/294 |
| 7,348,615 B2 | 3/2008 | Koizumi ........................ 257/292 |
| 7,408,210 B2 | 8/2008 | Ogura et al. .................. 257/233 |
| 7,429,764 B2 | 9/2008 | Koizumi et al. .............. 257/292 |
| 7,460,162 B2 | 12/2008 | Koizumi et al. .............. 348/294 |
| 7,466,003 B2 | 12/2008 | Ueno et al. .................... 257/462 |
| 7,528,878 B2 | 5/2009 | Sato et al. ..................... 348/317 |
| 7,538,810 B2 | 5/2009 | Koizumi et al. .............. 348/308 |
| 7,547,871 B2 | 6/2009 | Hiyama et al. ............ 250/208.1 |
| 7,550,793 B2 | 6/2009 | Itano et al. .................... 257/239 |
| 7,554,591 B2 | 6/2009 | Kikuchi et al. ............... 348/308 |
| 7,605,415 B2 | 10/2009 | Koizumi et al. .............. 257/291 |
| 7,616,355 B2 | 11/2009 | Yoneda et al. ................ 358/482 |
| 7,629,568 B2 | 12/2009 | Koizumi et al. ......... 250/214 R |
| 7,679,114 B2 | 3/2010 | Koizumi ........................ 257/292 |
| 7,808,537 B2 | 10/2010 | Fujimura et al. ............. 348/300 |
| 7,852,393 B2 | 12/2010 | Kikuchi et al. ............... 348/308 |
| 7,864,384 B2 | 1/2011 | Yoneda et al. ................ 358/482 |
| 7,872,286 B2 | 1/2011 | Okita et al. ................... 257/291 |
| 7,906,755 B2 | 3/2011 | Koizumi et al. ......... 250/214 R |
| 7,907,196 B2 | 3/2011 | Ogura et al. .................. 348/308 |
| 7,936,487 B2 | 5/2011 | Yoneda et al. ................ 358/482 |
| 7,939,868 B2 | 5/2011 | Koizumi ........................ 257/292 |
| 7,943,975 B2 | 5/2011 | Koizumi et al. .............. 257/291 |
| 7,948,540 B2 | 5/2011 | Ogura et al. .................. 348/300 |
| 7,948,541 B2 | 5/2011 | Koizumi et al. .............. 348/300 |
| 7,973,839 B2 | 7/2011 | Koizumi ........................ 348/294 |
| 7,978,241 B2 | 7/2011 | Koizumi et al. .............. 348/294 |
| 8,053,718 B2 | 11/2011 | Koizumi et al. ......... 250/214 R |
| 8,063,958 B2 | 11/2011 | Okita et al. ................... 348/241 |
| 8,085,319 B2 | 12/2011 | Ono et al. ..................... 348/241 |
| 8,089,545 B2 | 1/2012 | Koizumi et al. .............. 348/308 |
| 8,120,681 B2 | 2/2012 | Ryoki et al. .................. 348/294 |
| 8,169,525 B2 | 5/2012 | Ryoki et al. .................. 348/308 |
| 8,174,600 B2 | 5/2012 | Ogura et al. .................. 348/301 |
| 8,207,561 B2 | 6/2012 | Koizumi et al. .............. 257/291 |
| 8,248,677 B2 | 8/2012 | Yoneda et al. ................ 358/482 |
| 8,274,105 B2 | 9/2012 | Koizumi ........................ 257/292 |
| 8,319,872 B2 | 11/2012 | Koizumi ........................ 348/294 |
| 8,345,133 B2 | 1/2013 | Matsuda et al. .............. 348/294 |
| 8,390,708 B2 | 3/2013 | Koizumi et al. .............. 348/294 |
| 8,411,178 B2 | 4/2013 | Ogura et al. .................. 348/294 |
| 8,416,473 B2 | 4/2013 | Yoneda et al. ................ 358/482 |
| 8,421,894 B2 | 4/2013 | Koizumi et al. .............. 348/308 |
| 8,441,558 B2 | 5/2013 | Okita et al. ................... 348/241 |
| 8,477,224 B2 | 7/2013 | Ogura et al. .................. 348/302 |
| 8,520,102 B2 | 8/2013 | Ogura et al. .................. 348/248 |
| 8,520,108 B2 | 8/2013 | Ogura et al. .................. 348/300 |
| 8,553,115 B2 | 10/2013 | Arishima et al. ............. 348/294 |
| 8,553,118 B2 * | 10/2013 | Saito .................... H04N 3/1568 348/241 |
| 8,598,901 B2 | 12/2013 | Hiyama et al. ............ 324/750.3 |
| 8,624,307 B2 | 1/2014 | Koizumi et al. .............. 257/291 |
| 8,670,049 B2 | 3/2014 | Ono et al. ..................... 348/241 |
| 8,670,056 B2 | 3/2014 | Kono et al. ................... 348/294 |
| 8,698,935 B2 | 4/2014 | Okita et al. ................... 348/314 |
| 8,711,259 B2 | 4/2014 | Maehashi et al. ............ 348/294 |
| 8,749,675 B2 | 6/2014 | Koizumi et al. .............. 348/294 |
| 8,797,435 B2 | 8/2014 | Koizumi et al. .............. 348/300 |
| 8,836,838 B2 | 9/2014 | Nakamura et al. ........... 348/308 |
| 8,872,092 B2 | 10/2014 | Ryoki et al. .............. 250/214 R |
| 8,878,971 B2 | 11/2014 | Ryoki et al. .................. 348/294 |
| 8,883,526 B2 | 11/2014 | Okita et al. ..................... 438/24 |
| 8,896,029 B2 | 11/2014 | Koizumi et al. .............. 257/202 |
| 8,928,786 B2 | 1/2015 | Iwata et al. ................... 348/294 |
| 8,928,790 B2 | 1/2015 | Ogura et al. .................. 348/300 |
| 8,957,364 B2 | 2/2015 | Ryoki et al. .............. 250/214 R |
| 8,975,676 B2 | 3/2015 | Koizumi ........................ 257/292 |
| 9,007,501 B2 * | 4/2015 | Matsuda ........... H01L 27/14609 348/294 |
| 9,029,752 B2 | 5/2015 | Saito et al. ................ 250/208.1 |
| 9,048,155 B2 | 6/2015 | Matsuda et al. ............... H01L 27/14621 |
| 9,083,906 B2 | 7/2015 | Nakamura et al. ....... G02F 7/00 |
| 9,113,103 B2 | 8/2015 | Matsuda et al. ..... H04N 5/3415 |
| 9,118,857 B2 | 8/2015 | Iwata et al. ............ H04N 5/378 |
| 9,142,575 B2 | 9/2015 | Kobayashi et al. ........... H04N 5/37455 |
| 9,232,165 B2 | 1/2016 | Saito et al. ............. H03M 1/08 |
| 9,253,425 B2 | 2/2016 | Ryoki et al. ...... H01L 27/14603 |
| 9,276,036 B2 | 3/2016 | Arishima et al. ...... H04N 5/359 |
| 9,337,222 B2 | 5/2016 | Saito et al. ....... H01L 27/14609 |
| 9,392,195 B2 | 7/2016 | Ichikawa et al. .... H04N 5/3532 |
| 9,602,753 B2 | 3/2017 | Saito et al. ............. H04N 5/341 |
| 2004/0008270 A1 * | 1/2004 | Hisamatsu ............. H04N 5/185 348/257 |
| 2009/0201419 A1 * | 8/2009 | Takei ..................... H04N 5/378 348/308 |
| 2013/0181118 A1 | 7/2013 | Koizumi et al. ........... 250/208.1 |
| 2015/0122975 A1 | 5/2015 | Saito et al. ................ 250/208.1 |
| 2015/0281614 A1 | 10/2015 | Yoshida et al. ....... H04N 5/3745 |
| 2015/0281616 A1 | 10/2015 | Muto et al. .......... H04N 5/3575 |
| 2016/0247846 A1 | 8/2016 | Iida et al. ......... H01L 27/14643 |
| 2017/0078603 A1 | 3/2017 | Yamasaki et al. ... H04N 5/3742 |

\* cited by examiner

SOLID-STATE IMAGING DEVICE AND METHOD OF DRIVING SOLID-STATE IMAGING DEVICE WITH CLIPPING LEVEL SET ACCORDING TO TRANSFER OPERATION FREQUENCY

BACKGROUND OF THE INVENTION

Field of the Invention

The present invention relates to a solid-state imaging device and a method of driving the solid-state imaging device.

Description of the Related Art

In recent years, there have been proposed CMOS image sensors having the function of a global electronic shutter. With the global electronic shutters, imaging operation in which exposure periods match among a plurality of pixels is electrically controlled. With the use of the global electronic shutters, there is provided an advantage that an object image is hardly distorted even in taking an image of an object that is quickly moving.

In Japanese Patent Application Laid-Open No. 2015-177350, there is described a solid-state imaging device having a global electronic shutter function. The solid-state imaging device is configured to transfer charges from photoelectric converters to holding portions a plurality of times in an exposure period so that the saturation charge amount of pixels is increased while an increase in pixel size is prevented.

In solid-state imaging devices, when generated charges exceed the saturation charge amount of photoelectric converters or holding portions, image quality may deteriorate due to leakage of excessive charges. As a measure against such a deterioration in image quality, there has been known a method in which an output limit (clipping) level is set to a predetermined node. However, in the case of imaging operation including transferring charges from photoelectric converters to holding portions a plurality of times in an exposure period, a deterioration in image quality has not been sufficiently reduced by the related-art method depending on the mode of charge transfer.

SUMMARY OF THE INVENTION

It is an object of the present invention to provide a solid-state imaging device capable of effectively reducing a deterioration in image quality in performing imaging operation including transferring charges from a photoelectric converter to a holding portion a plurality of times in an exposure period, and a method of driving the solid-state imaging device.

According to one aspect of the present invention, there is provided a solid-state imaging device including a plurality of pixels each including a photoelectric converter configured to generate charges through photoelectric conversion, a holding portion configured to hold charges generated in the photoelectric converter, and a transfer unit configured to transfer charges from the photoelectric converter to the holding portion, the plurality of pixels each being configured to output a signal based on charges held in the holding portion, an output line, which is connected to the plurality of pixels, and to which the signal is output from each of the plurality of pixels, a clipping unit configured to limit a signal level of the signal so that the signal level falls within a range having an upper limit and a lower limit, one of which is determined by a clipping level, a transfer control unit configured to control the transfer unit so that the charges generated in the photoelectric converter during one exposure period are transferred to the holding portion through transfer operation performed at a frequency that is variable but at least once, and a clipping level control unit configured to control the clipping level so that the clipping level is set to a first clipping level when the transfer operation is performed at a first frequency, and the clipping level is set to a second clipping level that is different from the first clipping level when the transfer operation is performed at a second frequency that is different from the first frequency.

Further, according to another aspect of the present invention, there is provided a method of driving a solid-state imaging device including a plurality of pixels each including a photoelectric converter configured to generate charges through photoelectric conversion, a holding portion configured to hold charges generated in the photoelectric converter, and a transfer unit configured to transfer charges from the photoelectric converter to the holding portion, the plurality of pixels each being configured to output a signal based on the charges held in the holding portion, an output line, which is connected to the plurality of pixels, and to which the signal is output from each of the plurality of pixels, and a clipping unit configured to limit a signal level of the signal so that the signal level falls within a range having an upper limit and a lower limit, one of which is determined by a clipping level, the method including transferring charges generated in the photoelectric converter during one exposure period to the holding portion through transfer operation performed at a frequency that is variable but at least once, and setting the clipping level so that the clipping level is set to a first clipping level when the transfer operation is performed at a first frequency, and the clipping level is set to a second clipping level that is different from the first clipping level when the transfer operation is performed at a second frequency that is different from the first frequency.

Further, according to still another aspect of the present invention, there is provided an imaging system including a solid-state imaging device including a plurality of pixels each including a photoelectric converter configured to generate charges through photoelectric conversion, a holding portion configured to hold charges generated in the photoelectric converter, and a transfer unit configured to transfer charges from the photoelectric converter to the holding portion, the plurality of pixels each being configured to output a signal based on charges held in the holding portion, an output line, which is connected to the plurality of pixels, and to which the signal is output from each of the plurality of pixels, and a clipping unit configured to limit a signal level of the signal so that the signal level falls within a range having an upper limit and a lower limit, one of which is determined by a clipping level, a transfer control unit configured to control the transfer unit so that the charges generated in the photoelectric converter during one exposure period are transferred to the holding portion through transfer operation performed at a frequency that is variable but at least once, a clipping level control unit configured to control the clipping level so that the clipping level is set to a first clipping level when the transfer operation is performed at a first frequency, and the clipping level is set to a second clipping level that is different from the first clipping level when the transfer operation is performed at a second frequency that is different from the first frequency, and a signal processing unit configured to process the signal output from each of the plurality of pixels of the solid-state imaging device.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

A solid-state imaging device and a method of driving the solid-state imaging device according to a first embodiment of the present invention will be described with reference to FIG. 1 to FIG. 6.

Figure 1:
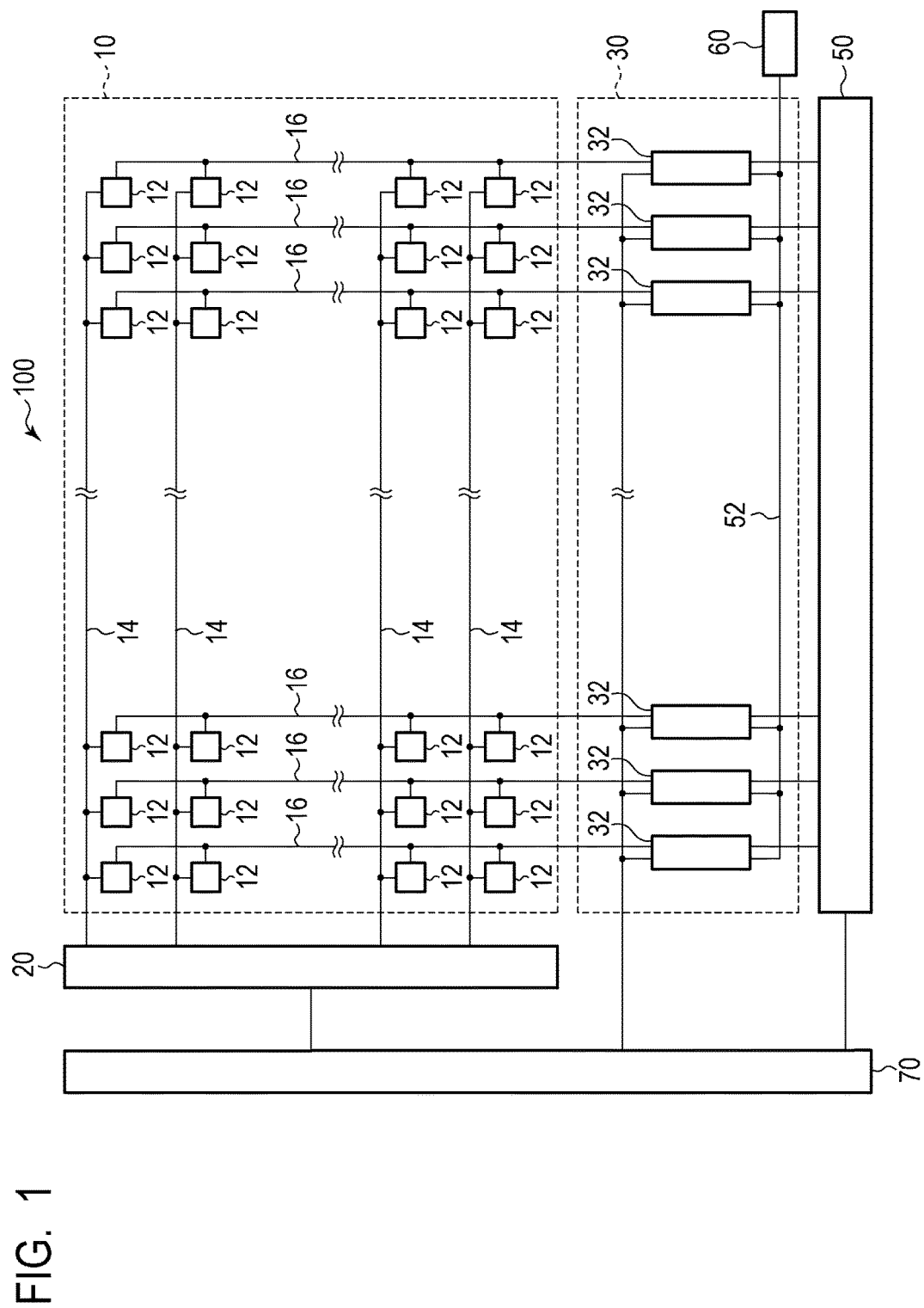
FIG. 1 is a block diagram for illustrating a configuration example of a solid-state imaging device according to a first embodiment of the present invention.
Figure 2:
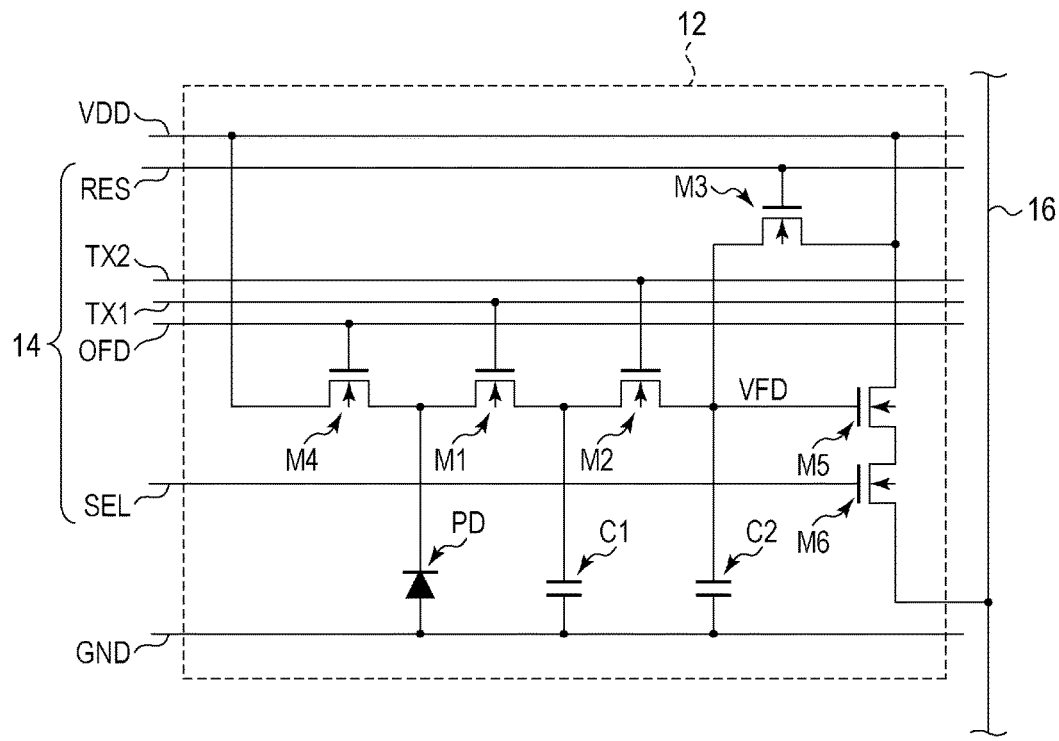
FIG. 2 is a circuit diagram for illustrating a configuration example of a pixel of the solid-state imaging device according to the first embodiment of the present invention.
Figure 3:
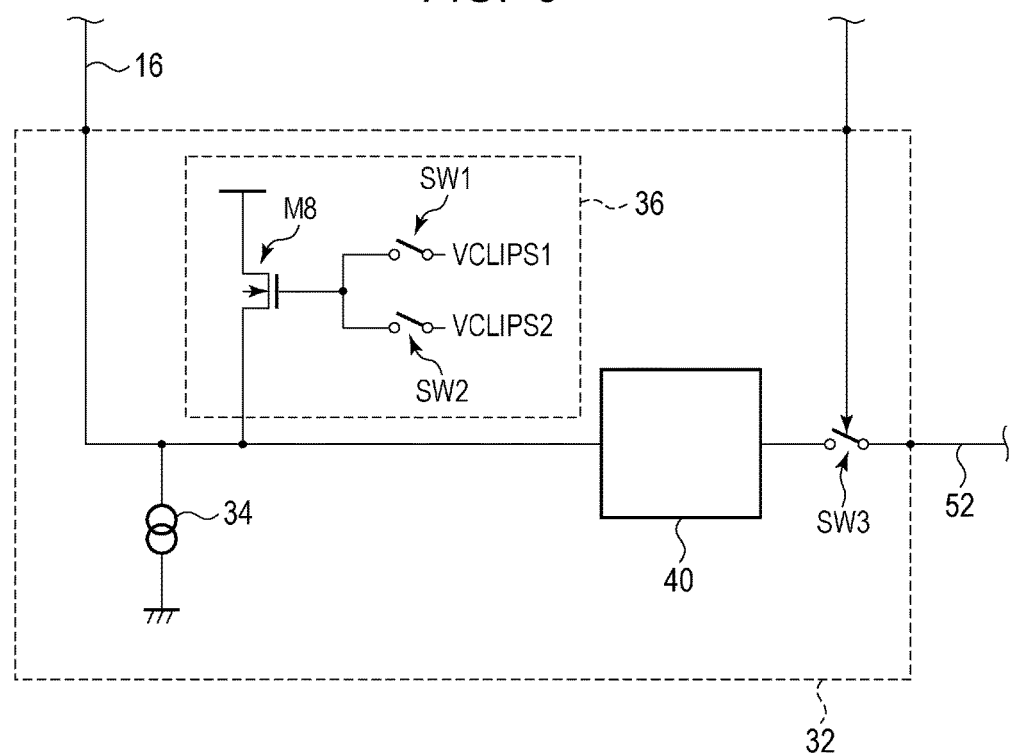
FIG. 3 is a circuit diagram for illustrating a configuration example of a column readout circuit of the solid-state imaging device according to the first embodiment of the present invention.
Figure 4:
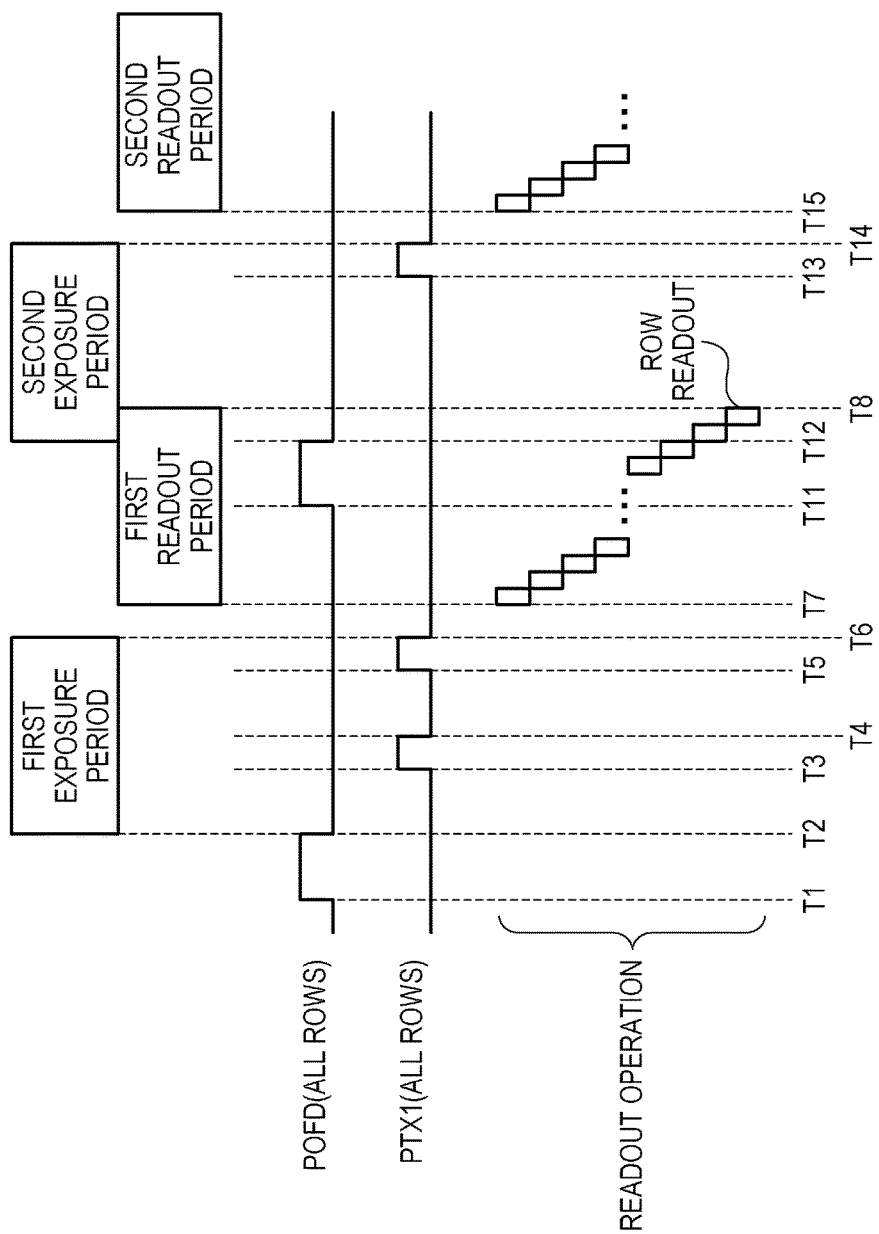
FIG. 4 and FIG. 5 are timing charts for illustrating a method of driving the solid-state imaging device according to the first embodiment of the present invention.
Figure 5:
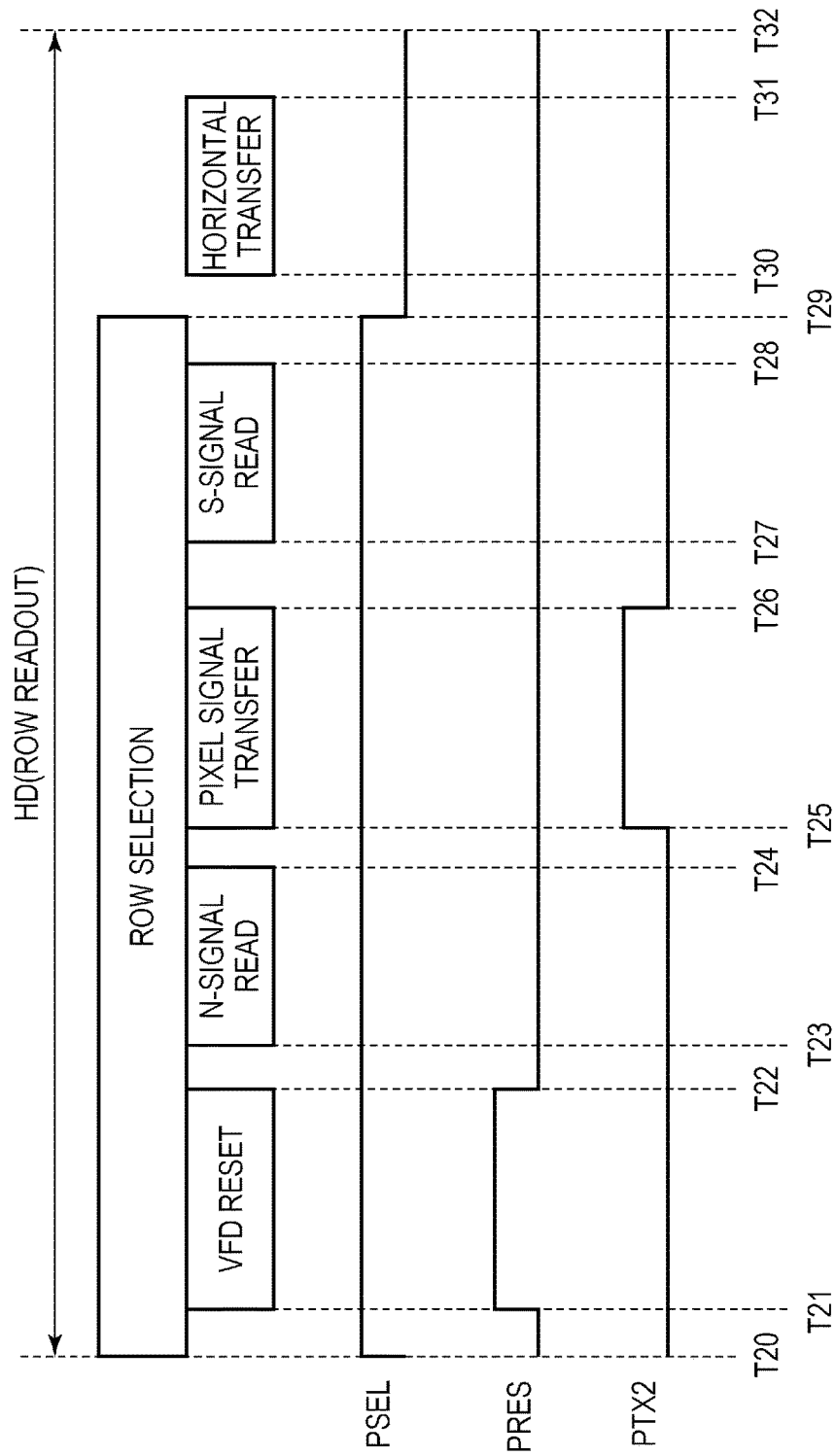
Figure 6:
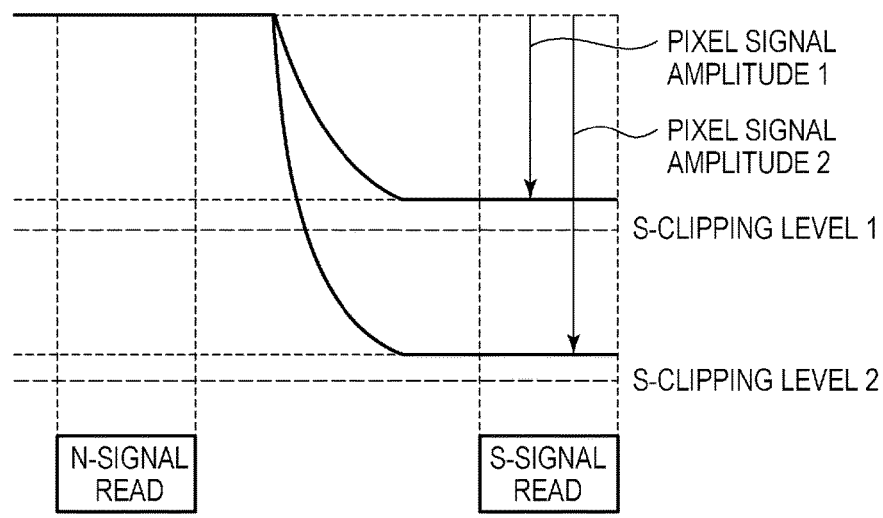
FIG. 6 is an explanatory diagram of the operation of a clipping circuit of the solid-state imaging device according to the first embodiment of the present invention.

FIG. 1 is a block diagram for illustrating a schematic configuration of the solid-state imaging device according to the present embodiment. FIG. 2 is a circuit diagram for illustrating a configuration example of a pixel of the solid-state imaging device according to the present embodiment. FIG. 3 is a circuit diagram for illustrating a configuration example of a column readout circuit of the solid-state imaging device according to the present embodiment. FIG. 4 and FIG. 5 are timing charts for illustrating a method of driving the solid-state imaging device according to the present embodiment. FIG. 6 is an explanatory diagram of the operation of a clipping circuit of the solid-state imaging device according to the present embodiment.

First, the structure of the solid-state imaging device according to the present embodiment is described with reference to FIG. 1 to FIG. 3.

A solid-state imaging device 100 according to the present embodiment includes, as illustrated in FIG. 1, a pixel array 10, a pixel driving unit 20, a readout circuit 30, a horizontal scanning unit 50, a signal output unit 60, and a drive signal generation unit 70.

The pixel array 10 includes a plurality of pixels arranged over a plurality of rows and a plurality of columns. Each of the pixels 12 includes a photoelectric converter configured to convert incident light into charges corresponding to the amount of the incident light, thereby outputting pixel signals corresponding to the amount of the incident light.

In each row of the pixel array 10, a pixel drive signal line 14 extending in a row direction is arranged. Each of the pixel drive signal lines 14 is a signal line shared by the pixels 12 belonging to a corresponding row. The pixel drive signal lines 14 are connected to the pixel driving unit 20. In each column of the pixel array 10, a pixel output line 16 extending in a column direction is arranged. Each of the pixel output lines 16 is a signal line shared by the pixels 12 belonging to a corresponding column. The pixel output lines 16 are connected to the readout circuit 30.

The pixel driving unit 20 is a control unit configured to control photoelectric conversion operation, charge transfer operation, and readout operation of the pixels 12 by supplying drive signals to the pixels 12 via the pixel drive signal lines 14. The pixel drive signal line 14 that is illustrated as one signal line in FIG. 1 includes a plurality of signal lines in actuality. The pixels 12 belonging to respective columns in a row selected by the pixel driving unit 20 simultaneously output pixel signals to the pixel output lines 16.

The readout circuit 30 includes a plurality of column readout circuits 32 arranged in the respective columns of the pixel array 10. Each of the column readout circuits is connected to the pixel output line 16 in a corresponding column. The column readout circuit 32 is a circuit unit configured to perform predetermined signal processing on pixel signals read out of the pixels 12 via the pixel output line 16. The column readout circuit 32 at least has a function to amplify pixel signals, and may have other functions including analog/digital (A/D) conversion as needed.

The horizontal scanning unit 50 is configured to sequentially transfer pixel signals processed in the readout circuit 30 to the signal output unit 60 for each column. The horizontal scanning unit 50 is configured to sequentially supply select signals to the column readout circuits 32 in the respective columns. With this configuration, pixel signals processed in the column readout circuits 32 are sequentially output to a common signal line 52 for each column. The horizontal scanning unit 50 includes a decoder or a shift register.

The signal output unit 60 is a circuit configured to output pixel signals read out of the pixels 12 to outside the solid-state imaging device 100. The signal output unit 60 may have a function to amplify output signals of the readout circuit 30.

The drive signal generation unit 70 is configured to supply control signals to the pixel driving unit 20, the readout circuit 30, and the horizontal scanning unit 50, thereby controlling driving and setting of those units with the control signals. For example, the drive signal generation unit 70 is configured to set voltage that is supplied to the pixel driving unit 20 and the readout circuit 30 and the output timing of the voltage. The drive signal generation unit 70 forms a transfer control unit together with the pixel driving unit 20. The transfer control unit is configured to control transfer units configured to transfer charges from the photoelectric converters to holding portions. Further, the drive signal generation unit 70 forms a clipping level control unit configured to control a clipping level so that when signals are read out of the pixels 12, the clipping level is changed depending on how many times charges are transferred from the photoelectric converters to the holding portions.

When the readout circuit 30 includes an A/D converter, pixel signals are output as digital signals from the readout circuit 30, and are transferred to the signal output unit 60. In this case, the signal output unit 60 may have a digital signal processing function. As the digital signal processing function, for example, a function of digital gain correction, digital correlated double sampling, or digital offset correction is given. Further, as the output configuration of the signal output unit 60, the solid-state imaging device 100 includes, for example, an output unit of a type in which voltage is output from a single terminal, or a low voltage differential signaling (LVDS) type having two differential terminals.

FIG. 2 is a configuration example of the pixel 12. The pixel 12 includes a photoelectric converter PD, transfer transistors M1 and M2, reset transistors M3 and M4, an amplifier transistor M5, and a select transistor M6.

The photoelectric converter PD is a photodiode, for example. The photodiode serving as the photoelectric converter PD has an anode connected to a ground voltage line GND, and a cathode connected to a source of the transfer transistor M1 and a source of the reset transistor M4. The reset transistor M4 is sometimes referred to as "overflow transistor." A drain of the transfer transistor M1 is connected to a source of the transfer transistor M2. A connection node between the transfer transistor M1 and the transfer transistor M2 has a capacitive component, and functions as a holding portion C1 for charges.

A drain of the transfer transistor M2 is connected to a source of the reset transistor M3 and a gate of the amplifier transistor M5. A node VFD being a connection node between the drain of the transfer transistor M2, the source of the reset transistor M3, and the gate of the amplifier transistor M5 has a capacitive component, and functions as a holding portion C2 for charges. The node VFD is sometimes referred to as "floating diffusion." The capacitors forming the holding portions C1 and C2 may be parasitic capacitors such as p-n junction capacitors or interconnection capacitors, or other kinds of capacitor elements including MOS capacitors.

Drains of the reset transistors M3 and M4 and a drain of the amplifier transistor M5 are connected to a power supply voltage line VDD. A source of the amplifier transistor M5 is connected to a drain of the select transistor M6. A source of the select transistor M6 is connected to the pixel output line 16.

In the pixel configuration of FIG. 2, each of the pixel drive signal lines 14 arranged in the respective rows of the pixel array 10 includes signal lines TX1, TX2, RES, OFD, and SEL. The signal line TX1 is connected to the gates of the transfer transistors M1 of the pixels 12 belonging to a corresponding row. The signal line TX2 is connected to the gates of the transfer transistors M2 of the pixels 12 belonging to the corresponding row. The signal line RES is connected to the gates of the reset transistors M3 of the pixels 12 belonging to the corresponding row. The signal line OFD is connected to the gates of the reset transistors M4 of the pixels 12 belonging to the corresponding row. The signal line SEL is connected to the gates of the select transistors M6 of the pixels 12 belonging to the corresponding row.

A drive signal PTX1 serving as a drive pulse for controlling the transfer transistor M1 is output from the pixel driving unit 20 to the signal line TX1. A drive signal PTX2 serving as a drive pulse for controlling the transfer transistor M2 is output from the pixel driving unit 20 to the signal line TX2. A drive signal PRES serving as a drive pulse for controlling the reset transistor M3 is output from the pixel driving unit 20 to the signal line RES. A drive signal POFD serving as a drive pulse for controlling the reset transistor M4 is output from the pixel driving unit 20 to the signal line OFD. A drive signal PSEL serving as a drive pulse for controlling the select transistor M6 is output from the pixel driving unit 20 to the signal line SEL. In a case where each transistor is an n-channel transistor, a corresponding transistor is on-state when being supplied with a drive signal at a high level from the pixel driving unit 20, whereas a corresponding transistor is off-state when being supplied with a drive signal at a low level from the pixel driving unit 20.

The photoelectric converter PD is configured to convert incident light into charges corresponding to the amount of the incident light (photoelectric conversion), and accumulate the generated charges. The reset transistor M4 is configured to reset the photoelectric converter PD to the potential of the power supply voltage line VDD. The transfer transistor M1 is configured to transfer charges in the photoelectric converter PD to the holding portion C1. The holding portion C1 is configured to hold charges generated due to incident light in a location other than the photoelectric converter PD. The transfer transistor M2 is configured to transfer charges in the holding portion C1 to the holding portion C2. The holding portion C2 is configured to hold charges transferred from the holding portion C1, and set the node VFD to a voltage corresponding to its capacitance value and the amount of the transferred charges. The reset transistor M3 is configured to reset the node VFD to the potential of the power supply voltage line VDD. The select transistor M6 is configured to select the pixel 12 that is to output a signal to the pixel output line 16. The amplifier transistor M5 is supplied with a power supply voltage at its drain and is supplied with a bias current at its source from a current source 34 (see FIG. 3) via the select transistor M6, and forms an amplifier portion (source follower circuit) whose input node is the gate of the amplifier transistor M5. With this configuration, the amplifier transistor M5 outputs, from the source, signals based on charges generated due to incident light to the pixel output line 16 via the select transistor M6. The photoelectric converter PD and the holding portion C2 may be reset with different voltages with the use of other power sources (not illustrated).

FIG. 3 is a configuration example of the column readout circuit 32. The column readout circuit 32 includes the current source 34, a clipping circuit 36, a signal processing unit 40, and a select switch SW3. The clipping circuit 36 includes a clipping transistor M8, and select switches SW1 and SW2. The current source 34 is connected to the pixel output line 16, and forms a source follower together with the amplifier transistor M5 of FIG. 2. The current source 34 is, for example, a constant current source that includes a MOS transistor having a gate to which the bias voltage is supplied. The clipping transistor M8 has a drain connected to the power supply voltage line, a source connected to the pixel output line 16, and a gate connected to one main node of the select switch SW1 and one main node of the select switch SW2. The other main node of the select switch SW1 is supplied with a reference voltage VCLIPS1 having any value. Further, the other main node of the select switch SW2 is supplied with a reference voltage VCLIPS2 having any value. The clipping transistor M8 and the current source 34 form a source follower. The signal processing unit 40 has an input terminal to which the pixel output line 16 is connected, and an output terminal to which the common signal line 52 is connected via the select switch SW3. The select switch SW3 is a switch that is controlled by a select signal supplied thereto from the horizontal scanning unit 50.

To the gate of the clipping transistor M8, the reference voltage VCLIPS1 can be supplied via the select switch SW1 and the reference voltage VCLIPS2 can be supplied via the select switch SW2. That is, the clipping transistor M8 has a function to limit the amplitude of pixel signals output from the amplifier transistor M5 to the pixel output line 16. In other words, the clipping transistor M8 has a function to limit the signal levels of pixel signals output from the amplifier transistor M5 to the pixel output line 16 so that the signal levels fall within a range having a predetermined clipping level as its upper limit or lower limit. As the level for limiting the amplitude of pixel signals, a level corresponding to the reference voltage VCLIPS1 or a level corresponding to the reference voltage VCLIPS2 can be set.

In the example illustrated in FIG. 3, in order to make it easier to understand the function of the clipping circuit 36, the gate of the clipping transistor M8 is supplied with the two types of reference voltages VCLIPS1 and VCLIPS2 via the different select switches SW1 and SW2. The gate of the clipping transistor M8 may be supplied with the reference voltage VCLIPS1 or the reference voltage VCLIPS2 output from a variable voltage source, via one select switch.

The signal processing unit 40 has a function to perform predetermined signal processing. Here, the signal processing unit 40 has a function to amplify pixel signals. In this case, the signal processing unit 40 can include a switched capacitor inverting amplifier (see FIG. 14), for example. The signal processing unit 40 may further have a function of correlated double sampling or A/D conversion.

Next, a method of driving the solid-state imaging device according to the present embodiment is described with reference to FIG. 4 to FIG. 6. Each transistor is on-state when a drive signal is at the high level, and is off-state when a drive signal is at the low level.

At time T1, the drive signals POFD that are supplied from the pixel driving unit 20 to the signal lines OFD in all rows transition from the low level to the high level, and the reset transistors M4 of all of the pixels 12 are thus turned on. Consequently, the photoelectric converters PD are connected to the power supply voltage line VDD via the reset transistors M4, and are reset to a potential corresponding to the power supply voltage.

Next, at time T2, the drive signals POFD that are supplied to the signal lines OFD in all rows transition from the high level to the low level, and the reset transistors M4 of all of the pixels 12 are thus turned off. Consequently, in all of the pixels 12, the reset state of the photoelectric converters PD is cancelled and the photoelectric converters PD simultaneously enter on an exposure period (first exposure period). During the exposure period, in the photoelectric converters PD, charges corresponding to the amount of incident light are generated through photoelectric conversion to be accumulated. At time T2, the first exposure period starts.

Next, in a period from time T2 to time T6 at which the first exposure period ends, the drive signals PTX1 that are supplied to the signal lines TX1 in all rows intermittently transition from the low level to the high level a plurality of times. In a period during which the drive signals PTX1 are at the high level, the transfer transistors M1 of the pixels 12 are on-state. Consequently, the charges accumulated in the photoelectric converters PD are transferred from the photoelectric converters PD to the holding portions C1 in the period during which the transfer transistors M1 are on-state. At a timing at which the drive signals PTX1 transition from the high level to the low level in the last transfer operation, the first exposure period ends (time T6).

Here, the drive signals PTX1 are set to the high level twice in total, that is, in a period from time T3 to time T4 and in a period from time T5 to time T6. In the period from time T3 to time T4, the transfer transistors M1 are turned on, and the charges accumulated in the photoelectric converters PD in the period from time T2 to time T4 are thus transferred to the holding portions C1. Further, in the period from time T5 to time T6, the transfer transistors M1 are turned on, and the charges accumulated in the photoelectric converters PD in the period from time T4 to time T6 are thus transferred to the holding portions C1. As a result, the charges accumulated in the photoelectric converters PD in the period from time T2 to time T6, which corresponds to the first exposure period, are transferred from the photoelectric converters PD to the holding portions C1 to be held in the holding portions C1.

In the example of the present embodiment, the transfer transistors M1 are turned on twice in the first exposure period, but the transfer transistors M1 may be turned on once or three times or more. Further, the transfer transistors M1 are desirably turned on at equal intervals, but the intervals are not necessarily equal to each other.

Next, in a period from time T7 to time T8, signals based on the charges held in the holding portions C1 are read out (first readout period). In the first readout period, the signals are sequentially read out of the pixels 12 to the pixel output lines 16 for each row. In FIG. 4, a plurality of rectangular regions (indicated as "row readout" in FIG. 4) arranged in an oblique direction schematically represent that readout operation is sequentially performed for each row. When the pixel signals are read out of the pixels 12 in the last row at time T8, the first readout period ends. During the first readout period, the reference voltage VCLIPS2 is applied to the gates of the clipping transistors M8 of the clipping circuits 36 via the select switches SW2. The specific readout operation for each row including the operation of the clipping circuits 36 is described later.

In this way, imaging operation in which the photoelectric converters PD perform the photoelectric conversion operation and accumulation in the same period (first exposure period) among the plurality of pixels 12, that is, the so-called global electronic shutter operation can be performed.

In a similar manner, at time T11 that comes after time T6 at which the first exposure period ends, the drive signals POFD that are supplied to the signal lines OFD in all rows transition from the low level to the high level, and the reset transistors M4 of all of the pixels 12 are thus turned on. Consequently, the photoelectric converters PD are connected to the power supply voltage line VDD via the reset transistors M4, and are reset to a potential corresponding to the power supply voltage.

Next, at time T12, the drive signals POFD that are supplied to the signal lines OFD in all rows transition from the high level to the low level, and the reset transistors M4 of all of the pixels 12 are thus turned off. Consequently, in all of the pixels 12, the reset state of the photoelectric converters PD is cancelled and the photoelectric converters PD are simultaneously enter on an exposure period (second exposure period). At time T12, the second exposure period starts.

In the driving example of the present embodiment, the first readout period and the second exposure period partially overlap each other, but the first readout period and the second exposure period do not necessarily overlap each other. In short, time T12 may start after time T8.

Next, in a period from time T12 to time T14 at which the second exposure period ends, the drive signals PTX1 that are supplied to the signal lines TX1 in all rows transition from the low level to the high level once. In a period during which the drive signals PTX1 are at the high level, the transfer transistors M1 of the pixels 12 are on-state. Consequently, the charges generated and accumulated in the photoelectric converters PD are transferred from the photoelectric converters PD to the holding portions C1 in the period during which the transfer transistors M1 are on-state.

Here, the drive signals PTX1 are set to the high level in a period from time T13 to time T14. In the period from time T13 to time T14, the transfer transistors M1 are on-state, and the charges accumulated in the photoelectric converters PD in the period from time T12 to time T14 are thus transferred to the holding portions C1.

In the example of the present embodiment, the transfer transistors M1 are turned on once in the second exposure period, but the transfer transistors M1 may be turned on two times or more. Here, the transfer transistors M1 are turned on once in the second exposure period as an example in which the transfer transistors M1 are turned on at a frequency that is different from the frequency at which the transfer transistors M1 are turned on in the first exposure period (twice). Further, when the transfer transistors M1 are turned on a plurality of times, the transfer transistors M1 are desirably turned on at equal intervals, but the intervals are not necessarily equal to each other.

Next, from time T15 that comes after the second exposure period ends, similar to the first readout period, signals based on the charges held in the holding portions C1 are read out (second readout period). During the second readout period, the reference voltage VCLIPS1 is applied to the gates of the clipping transistors M8 via the select switches SW1.

Next, with reference to FIG. 5, the details of the readout operation for each row are described. The operation illustrated in FIG. 5 corresponds to the operation of "row readout" in FIG. 4. Here, of the plurality of rows belonging to the pixel array 10, the readout operation of the pixels 12 in an n-th row is described as an example.

At time T20, the drive signal PSEL that is supplied from the pixel driving unit 20 to the signal line SEL in the n-th row transitions from the low level to the high level, and the select transistors M6 of the pixels 12 in the n-th row are thus turned on. Consequently, the pixels 12 in the n-th row are selected, and the pixels 12 in the n-th row are ready to output pixel signals to the pixel output lines 16.

Next, in a period from time T21 to time T22, the drive signal PRES that is supplied from the pixel driving unit 20 to the signal line RES in the n-th row transitions from the low level to the high level, and the reset transistors M3 of the pixels 12 in the n-th row are thus turned on. Consequently, the nodes VFD are connected to the power supply voltage line VDD via the reset transistors M3, and are reset to a potential (reset potential) corresponding to the power supply voltage (VFD reset). As a result, reference signals (N-signals) corresponding to the reset potential of the nodes VFD are output to the pixel output lines 16.

Next, in a period from time T23 to time T24, the readout operation of N-signals is performed in the readout circuit 30. The readout operation of N-signals in this period is herein referred to as "N-signal read."

Next, in a period from time T25 to time T26, the drive signal PTX2 that is supplied from the pixel driving unit 20 to the signal line TX2 in the n-th row transitions from the low level to the high level. Consequently, the transfer transistors M2 of the pixels 12 in the n-th row are turned on, and the charges held in the holding portions C1 are transferred to the holding portions C2 (pixel signal transfer). Then, the nodes VFD are set to a potential corresponding to the amount of charges that are transferred to the holding portions C2, through charge voltage conversion by the capacitors of the holding portions C2. As a result, pixel signals (S-signals) corresponding to the amount of charges that are transferred from the holding portions C1 to the holding portions C2 are output to the pixel output lines 16.

Next, in a period from time T27 to time T28, the readout operation of S-signals is performed in the readout circuit 30. The readout operation of S-signals in this period is herein referred to as "S-signal read."

The thus read out N-signals and S-signals may be subjected to correlated double sampling processing in the readout circuit 30 or the signal output unit 60 in the subsequent stage so that noise components are removed from the signals. Alternatively, only the S-signals may be used.

Next, at time T29, the drive signal PSEL that is supplied from the pixel driving unit 20 to the signal line SEL in the n-th row transitions from the high level to the low level, and the select transistors M6 of the pixels 12 in the n-th row are thus turned off. Consequently, the selected state of the pixels 12 in the n-th row is cancelled.

Next, in a period from time T30 to time T31, the signals read out to the column readout circuits 32 in the respective columns are sequentially transferred to the signal output unit 60 for each column ("horizontal transfer" in FIG. 5).

At time T32 subsequent to time T31, the sequence of the readout operation for the n-th row is completed. The period from time T20 to time T32 is one horizontal period corresponding to the readout operation for one row.

As described above, in the method of driving the solid-state imaging device according to the present embodiment, the transfer transistors M1 are turned on a plurality of times (here, twice) so that charges are intermittently transferred from the photoelectric converters PD to the holding portions C1 during the first exposure period. In other words, charges generated in the photoelectric converters PD during one exposure period are transferred to the holding portions C1 through transfer operation performed at a frequency that is variable but once or more. One of reasons why charges are intermittently transferred from the photoelectric converters PD to the holding portions C1 a plurality of times is to ensure a sufficient saturation charge amount of the pixels 12 while preventing an increase in pixel size.

In order to transfer charges from the photoelectric converters PD to the holding portions C1 at one time, it is necessary that the saturation charge amount of the photoelectric converters PD and the saturation charge amount of the holding portions C1 be substantially the same. In this case, in order to increase the saturation charge amount of the pixels 12, the saturation charge amount of the photoelectric converters PD and the saturation charge amount of the holding portions C1 are both to be increased, leading to an unavoidable increase in pixel size.

With the configuration in which charges are transferred from the photoelectric converters PD to the holding portions C1 a plurality of times, a sufficient saturation charge amount of the pixels 12 can be ensured without an increase in saturation charge amount of the photoelectric converters PD. For example, the saturation charge amount of the photoelectric converter PD is represented by QP, the saturation charge amount of the holding portion C1 is represented by QM, and the frequency at which charges are transferred from the photoelectric converter PD to the holding portions C1 is represented by N. Then, the saturation charge amount QP can be set to about QM/N, and an increase in pixel size can be prevented.

As an example, there is assumed a case where the holding portions C1 reach the saturation charge amount QM when charges corresponding to the saturation charge amount QP are transferred thereto from the photoelectric converters PD N times. In this case, the maximum saturation charge amount of the pixels 12 is the saturation charge amount QM of the holding portions C1, and can be regarded as being equivalent to the amount of charges when the photoelectric converters PD are saturated N times. Further, the minimum saturation charge amount of the pixels 12 is the saturation charge amount QP of the photoelectric converters PD, and can be regarded as being equivalent to the amount of charges when the photoelectric converters PD are saturated once. In short, the saturation charge amount of the pixels 12 changes depending on how many times charges are transferred from the photoelectric converters PD to the holding portions C1.

Further, in the present embodiment, the frequency at which charges are transferred from the photoelectric converters PD to the holding portions C1 is changed depending on the amount of light entering the photoelectric converters PD. That is, charges are transferred from the photoelectric converters PD to the holding portions C1 twice in the first exposure period, and the charges are transferred once in the second exposure period. In terms of ensuring a sufficient saturation charge amount of the pixels 12, charges are preferably transferred from the photoelectric converters PD to the holding portions C1 a plurality of times. However, if charges are transferred a plurality of times when the amount of incident light is small, noise components accompanying driving of the transfer transistors M1 increase to reduce an S/N ratio. It is accordingly desired that the frequency at which charges are transferred from the photoelectric converters PD to the holding portions C1 be changed depending on the amount of light entering the photoelectric converters PD.

Meanwhile, when charges are generated with high luminance to exceed the saturation charge amount of the pixels 12, charges that are overflowed from the photoelectric converters PD or the holding portions C1 are sometimes output to the pixel output lines 16 as pixel signals. As a result, the operating point of the current source 34 is affected and the current value of the current source 34 thus changes, with the result that the common impedances of the power source, GND, and other such components change, which may influence the characteristics of pixel signals in adjacent columns. Further, as described above, the saturation charge amount of the pixels 12 changes depending on how many times charges are transferred from the photoelectric converters PD to the holding portions C1.

In view of the foregoing, in the present embodiment, the clipping circuits 36 are connected to the pixel output lines 16, and an amplitude limit level for pixel signals is changed depending on how many times charges are transferred from the photoelectric converters PD to the holding portions C1, that is, the saturation charge amount of the pixels 12. For example, the amplitude limit level is set to a first clipping level when the transfer operation is performed at a first frequency, and the amplitude limit level is set to a second clipping level that is different from the first clipping level when the transfer operation is performed at a second frequency that is different from the first frequency.

FIG. 6 is a diagram for illustrating a relationship between the signal level of the pixel output line 16 and clipping levels. After an N-signal read, charges are transferred from the holding portion C1 to the holding portion C2, and the signal level of the pixel output line 16 thus drops from a reset level to a signal level corresponding to the amount of transferred charges. In FIG. 6, there are illustrated a case where a pixel signal having an amplitude corresponding to a pixel signal amplitude 1 is read out, and a case where a pixel signal having an amplitude corresponding to a pixel signal amplitude 2 is read out.

In FIG. 6, an S-clipping level 1 and an S-clipping level 2 represent the optimum amplitude limit level for the pixel signal amplitude 1 and the optimum amplitude limit level for the pixel signal amplitude 2, respectively. The S-clipping level 1 and the S-clipping level 2 can be set by supplying the predetermined reference voltages VCLIPS1 and VCLIPS2 to the gate of the clipping transistor M8 of the clipping circuit 36 via the select switches SW1 and SW2.

For example, in the driving example of FIG. 4, the clipping level for the clipping transistors M8 is set to the S-clipping level 2 in the first readout period, and the clipping level for the clipping transistors M8 is set to the S-clipping level 1 in the second readout period. The S-clipping level 1 and the S-clipping level 2 are appropriately set depending on the saturation charge amount of the pixels (the frequency at which charges are transferred from the photoelectric converters PD to the holding portions C1) in each readout period. Those values can be set to any value in the drive signal generation unit 70.

When pixel signals at a level that is lower than the gate voltage of the clipping transistors M8 by a threshold voltage or more are output to the pixel output lines 16, the clipping transistors M8 are turned on, and the minimum signal level of the pixel output lines 16 is limited to a predetermined signal level corresponding to the gate voltage. In this way, a change in current value of the current source 34 can be prevented, and as a result, the influence on the characteristics of pixel signals in adjacent columns can be prevented.

The driving example of FIG. 4 is an example of taking a moving image including a frame period in which charges are transferred from the photoelectric converters PD to the holding portions C1 twice in an exposure period, and a frame period in which charges are transferred from the photoelectric converters PD to the holding portions C1 once in an exposure period. However, the frequency at which charges are transferred from the photoelectric converters PD to the holding portions C1 in an exposure period may be determined in advance in consideration of imaging conditions (for example, ISO setting), and may be fixed in imaging. Also in this case, the clipping level for pixel signals, which is described later, is determined depending on how many times charges are transferred from the photoelectric converters PD to the holding portions C1.

Further, in the driving example of FIG. 4, the period from time T2 to time T6 corresponds to one exposure period. In this example, one exposure period is continuous. However, a plurality of exposure periods, which is obtained through division, may form one exposure period. For example, the reset transistors M4 may be turned on in a part of the period from time T4 to time T5 in FIG. 4. However, charges transferred to the holding portions C1 in the first transfer (time T3 to time T4), and charges transferred to the holding portions C1 in the second transfer (time T5 to time T6) are added together in the holding portions C1. Thus, also in this case, charges generated in one exposure period are transferred to the holding portions C1 through the first and second transfers.

As described above, according to the present embodiment, the clipping level for the pixel output lines is changed depending on how many times charges are transferred from the photoelectric converters to the holding portions. As a result, the influence on the characteristics of pixel signals in adjacent columns, which occurs when luminance is high, can be effectively prevented, and image quality can thus be improved.

Second Embodiment

Figure 7:
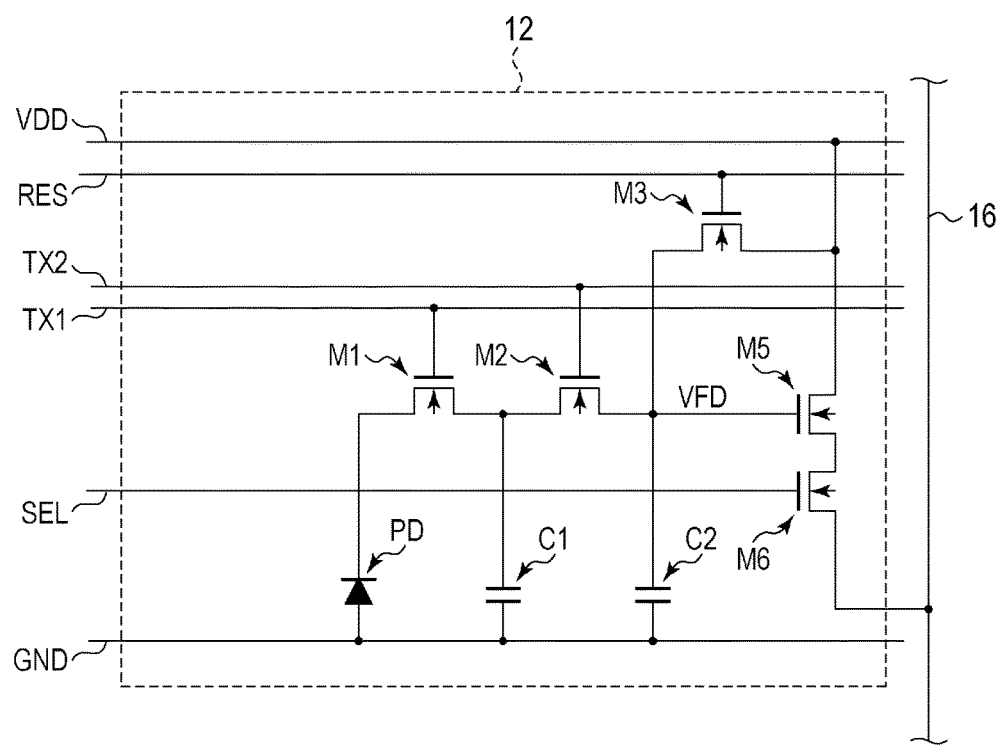
FIG. 7 is a circuit diagram for illustrating a configuration example of a pixel of a solid-state imaging device according to a second embodiment of the present invention.
Figure 8:
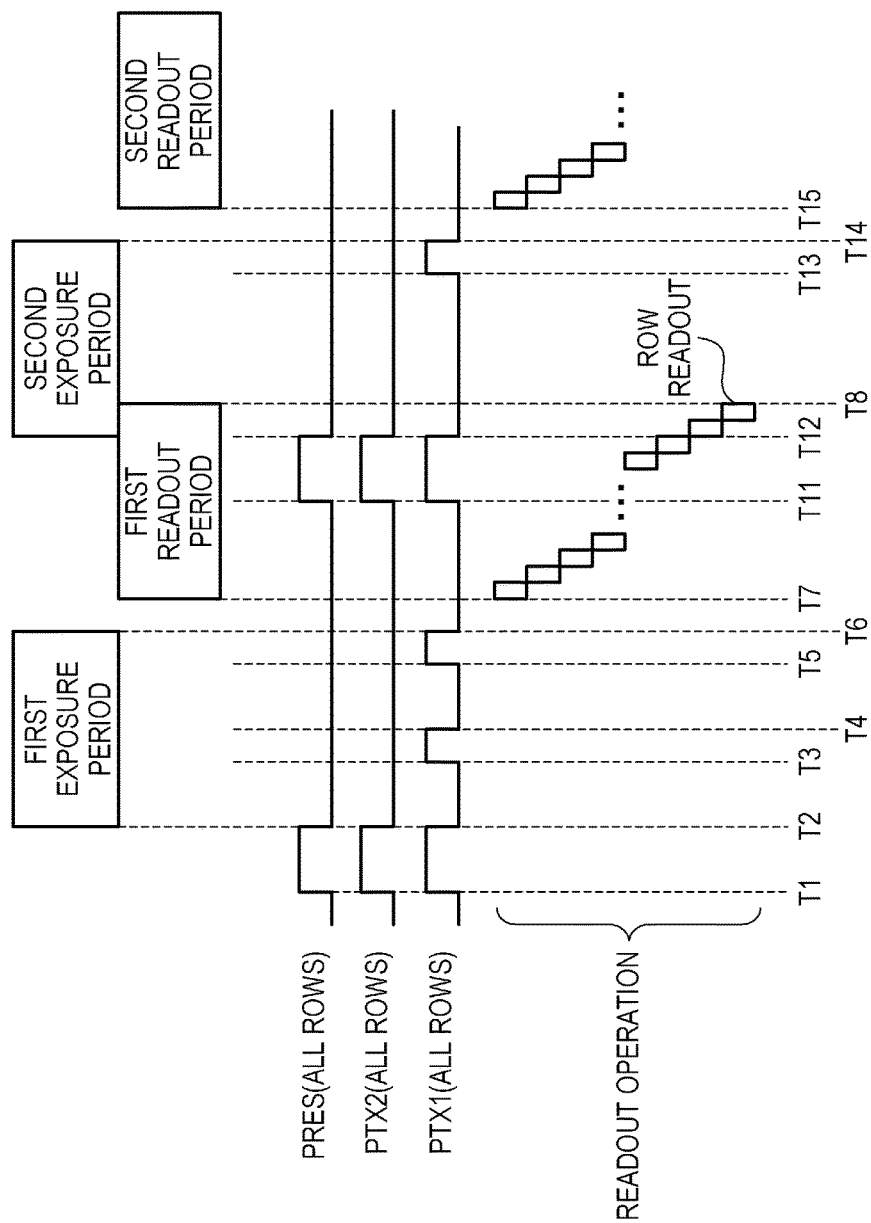
FIG. 8 is a timing chart for illustrating a method of driving the solid-state imaging device according to the second embodiment of the present invention.

A solid-state imaging device and a method of driving the solid-state imaging device according to a second embodiment of the present invention will be described with reference to FIG. 7 and FIG. 8. FIG. 7 is a circuit diagram for illustrating a configuration example of a pixel of the solid-state imaging device according to the present embodiment. FIG. 8 is a timing chart for illustrating the method of driving the solid-state imaging device according to the present embodiment. The same components as those of the solid-state imaging device according to the first embodiment illustrated in FIG. 1 to FIG. 6 are denoted by like reference symbols, and descriptions thereof are omitted or simplified.

The solid-state imaging device according to the present embodiment is similar to the solid-state imaging device according to the first embodiment except for the circuit configuration of the pixels 12. The solid-state imaging device according to the present embodiment differs from the solid-state imaging device according to the first embodiment in that the pixel 12 does not include the reset transistor M4 as illustrated in FIG. 7.

In the first embodiment, an exposure period starts when the reset transistor M4, which has been turned on, is controlled to be turned off, but the transfer transistors M1 and M2 and the reset transistor M3 can be used instead of the reset transistor M4.

For example, as illustrated in FIG. 8, in a period from time T1 to time T2, the drive signals PRES, PTX1, and PTX2 are set to the high level so that the photoelectric converter PD is reset via the reset transistor M3 and the transfer transistors M2 and M1. At time T2, the drive signals PRES, PTX1, and PTX2 are set to the low level so that the first exposure period can start. The same applies to a period from time T11 to time T12.

The reset transistor M4 is removed, and hence the space for the reset transistor M4 can be used for other purposes such as a reduction in pixel size and an increase in saturation charge amount of the photoelectric converter PD and the holding portions C1 and C2.

The above-mentioned effect provided by the solid-state imaging device according to the first embodiment can be similarly achieved by the solid-state imaging device according to the present embodiment.

Third Embodiment

Figure 9:
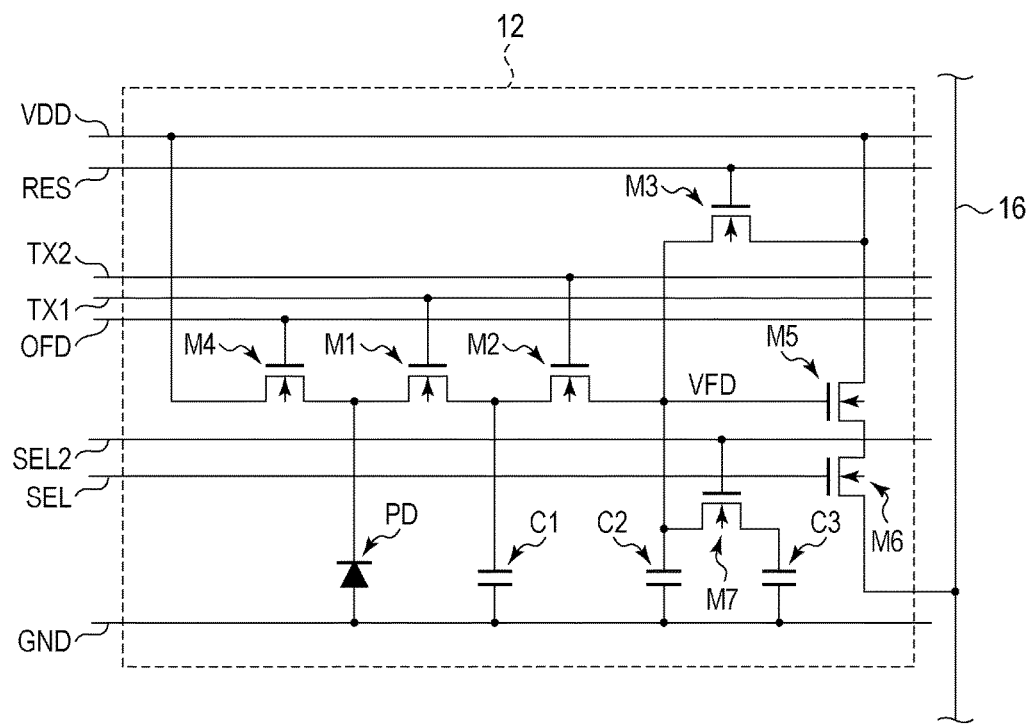
FIG. 9 is a circuit diagram for illustrating a configuration example of a pixel of a solid-state imaging device according to a third embodiment of the present invention.

A solid-state imaging device and a method of driving the solid-state imaging device according to a third embodiment of the present invention are described with reference to FIG. 9. FIG. 9 is a circuit diagram for illustrating a configuration example of a pixel of the solid-state imaging device according to the present embodiment. The same components as those of the solid-state imaging devices according to the first and second embodiments illustrated in FIG. 1 to FIG. 8 are denoted by like reference symbols, and descriptions thereof are omitted or simplified.

The solid-state imaging device according to the present embodiment is similar to the solid-state imaging device according to the first embodiment except for the circuit configuration of the pixels 12. The solid-state imaging device according to the present embodiment differs from the solid-state imaging device according to the first embodiment in that a holding portion C3 is connected to the node VFD via a select transistor M7 as illustrated in FIG. 9.

The holding portion C3 is connected to the node VFD via the select transistor M7, and hence the capacitance value of a capacitor connected to the node VFD can be switched. Specifically, when the select transistor M7 is turned off, the capacitance value of the node VFD is the capacitance value of the holding portion C2. When the select transistor M7 is turned on, the capacitance value of the node VFD is the capacitance value of the combined capacitor of the holding portion C2 and the holding portion C3.

Through switching of the capacitance value of the capacitor connected to the node VFD, the rate of change of the potential of the node VFD, that is, the amplification factor of the amplifier portion whose input node is the gate of the amplifier transistor M5 can be switched. The rate of change of the potential of the node VFD depends on the amount of charges that are transferred to the node VFD. In this context, the select transistor M7 and the holding portion C3 connected to the node VFD can be regarded as being an amplification unit. The select transistor M7 can be controlled by a drive signal supplied from the pixel driving unit 20 to the signal line SEL2 that is connected to the gate of the select transistor M7.

In the configuration of the present embodiment, the select transistor M7 and the holding portion C3 are added to the pixel 12 of the solid-state imaging device according to the first embodiment. However, the present embodiment may employ a configuration in which the select transistor M7 and the holding portion C3 are added to the pixel 12 of the solid-state imaging device according to the second embodiment.

The above-mentioned effect provided by the solid-state imaging device according to the first embodiment can be similarly achieved by the solid-state imaging device according to the present embodiment.

Fourth Embodiment

Figure 10:
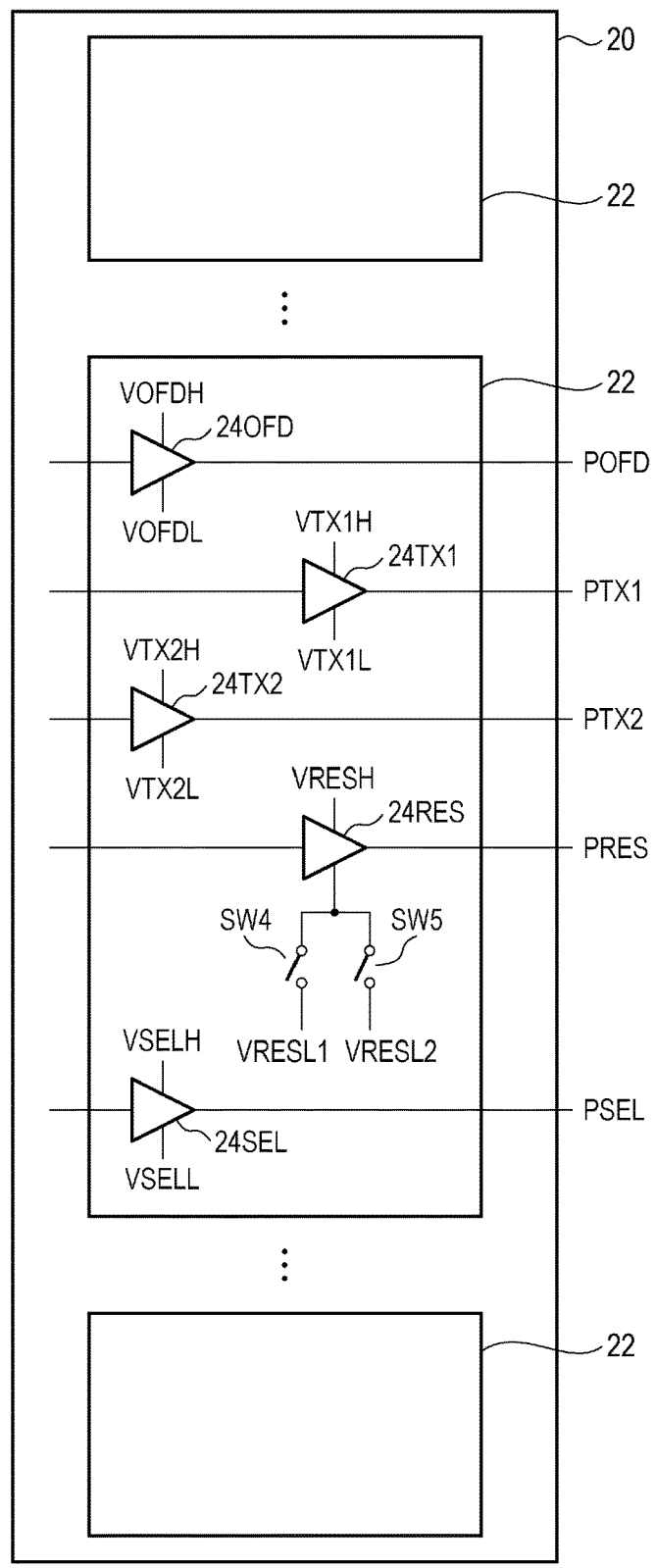
FIG. 10 is a circuit diagram for illustrating a configuration example of a pixel driving unit of a solid-state imaging device according to a fourth embodiment of the present invention.
Figure 11:
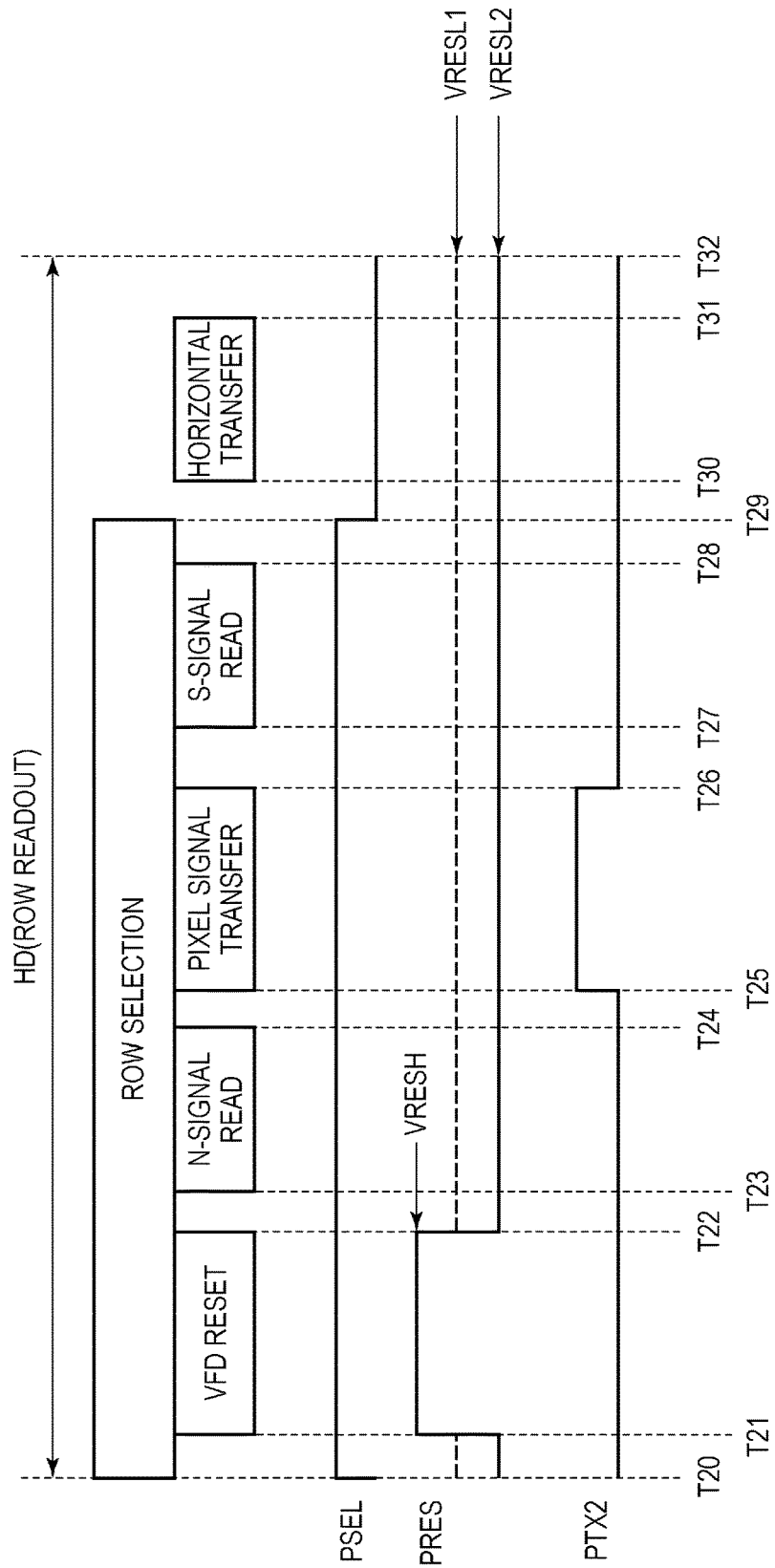
FIG. 11 is a timing chart for illustrating a method of driving the solid-state imaging device according to the fourth embodiment of the present invention.

A solid-state imaging device and a method of driving the solid-state imaging device according to a fourth embodiment of the present invention will be described with reference to FIG. 10 and FIG. 11. FIG. 10 is a circuit diagram for illustrating a configuration example of a pixel driving unit of the solid-state imaging device according to the present embodiment. FIG. 11 is a timing chart for illustrating the method of driving the solid-state imaging device according to the present embodiment. The same components as those of the solid-state imaging devices according to the first to third embodiments illustrated in FIG. 1 to FIG. 9 are denoted by like reference symbols, and descriptions thereof are omitted or simplified.

In the solid-state imaging device according to the first embodiment, the clipping circuit 36 is connected to the pixel output line 16 so that the signal level of the pixel output line 16 is limited, but the signal level of the pixel output line 16 can also be limited by the reset transistor M3. Specifically, because the amplifier portion of the pixel 12 includes the source follower circuit, the signal level of the pixel output line 16 can be limited indirectly through clipping of the node VFD by the reset transistor M3. In the present embodiment, the solid-state imaging device capable of limiting the signal level of the pixel output line 16 using the reset transistor M3, and the method of driving the solid-state imaging device are described.

The basic configuration of the solid-state imaging device according to the present embodiment is similar to that of the solid-state imaging device according to the first embodiment illustrated in FIG. 1 to FIG. 3. The solid-state imaging device according to the present embodiment is configured so that two kinds of drive signals PRESL1 and PRESL2 at the low level can be supplied as the drive signal PRES that the pixel driving unit 20 supplies to the gate of the reset transistor M3.

The pixel driving unit 20 of the solid-state imaging device according to the present embodiment includes, as illustrated in FIG. 10, a plurality of drive buffer blocks 22 corresponding to the respective rows of the pixel array 10. Each of the drive buffer blocks 22 includes drive buffers 24OFD, 24TX1, 24TX2, 24RES, and 24SEL.

The drive buffer 24OFD is configured to output the drive signal POFD at the high level corresponding to a power supply voltage VOFDH when an input signal is at the high level, and output the drive signal POFD at the low level corresponding to a power supply voltage VOFDL when the input signal is at the low level. The drive buffer 24TX1 is configured to output the drive signal PTX1 at the high level corresponding to a power supply voltage VTX1H when an input signal is at the high level, and output the drive signal PTX1 at the low level corresponding to a power supply voltage VTX1L when the input signal is at the low level. The drive buffer 24TX2 is configured to output the drive signal PTX2 at the high level corresponding to a power supply voltage VTX2H when an input signal is at the high level, and output the drive signal PTX2 at the low level corresponding to a power supply voltage VTX2L when the input signal is at the low level. The drive buffer 24SEL is configured to output the drive signal PSEL at the high level corresponding to a power supply voltage VSELH when an input signal is at the high level, and output the drive signal PSEL at the low level corresponding to a power supply voltage VSELL when the input signal is at the low level.

The drive buffer 24RES is configured to output the drive signal PRES at the high level corresponding to a power supply voltage VRESH when an input signal is at the high level. Meanwhile, the drive buffer 24RES is configured to output the drive signal PRES at the low level corresponding to a power supply voltage VRESL1 or the drive signal PRES at the low level corresponding to a power supply voltage VRESL2 when the input signal is at the low level. The power supply voltage VRESL1 or VRESL2 is selected by driving one of the select switches SW4 and SW5. One low-side power supply voltage VRESL may be selected from three or more types of voltages.

Next, the method of driving the solid-state imaging device according to the present embodiment is described with reference to FIG. 11.

The method of driving the solid-state imaging device according to the present embodiment differs from the first embodiment in that one of the two types of power supply voltages VRESL1 and VRESL2 is selected as the drive signal PRES at the low level for the reset transistor M3 in a row readout period.

In the period from time T21 to time T22, the pixel driving unit 20 outputs the drive signal PRES at the high level corresponding to the power supply voltage VRESH. The node VFD is thus reset to a potential corresponding to the voltage of the power supply voltage line VDD via the reset transistor M3.

In a period from time T20 to time T21 and a period from time T22 to time T32, the pixel driving unit 20 outputs the drive signal PRES at the low level corresponding to the power supply voltage VRESL1 or the power supply voltage VRESL2. Consequently, the lower limit of the potential of the node VFD is limited to a predetermined potential corresponding to the power supply voltage VRESL1 or VRESL2. Specifically, the potential of the node VFD is limited so as not to fall below (gate potential of reset transistor M3 (VRESL1 or VRESL2)−threshold voltage of reset transistor M3).

In the first embodiment, the S-clipping level 1 and the S-clipping level 2 illustrated in FIG. 6 are set with the use of the clipping transistor M8, but such setting can be made with the use of the reset transistor M3 in the present embodiment. Specifically, a gate potential of the amplifier transistor M5 when the potential of the pixel output line 16 is at the S-clipping level 1 is set as the power supply voltage VRESL1. Further, a gate potential of the amplifier transistor M5 when the potential of the pixel output line 16 is at the S-clipping level 2 is set as the power supply voltage VRESL2. The power supply voltage VRESL2 may be a GND level. When the potentials of the power supply voltages VRESL1 and VRESL2 are set to satisfy the relationship of VRESL1>VRESL2, a signal amplitude at the node VFD is limited to a lower level when the power supply voltage VRESL1 is selected than when the power supply voltage VRESL2 is selected.

When the present embodiment is applied to the driving example of FIG. 4, in the first readout period, the power supply voltage VRESL2 is selected by selectively turning on the select switches SW5 so that the lower limit of the potential of the pixel output lines 16 is limited to the S-clipping level 2. Further, in the second readout period, the power supply voltage VRESL1 is selected by selectively turning on the select switches SW4 so that the lower limit of the potential of the pixel output lines 16 is limited to the S-clipping level 1.

In the method of the present embodiment, the potential of the pixel output line 16 is limited using the reset transistor M3 instead of the clipping transistor M8. However, the potential of the pixel output line 16 may be limited using both of the clipping transistor M8 and the reset transistor M3. Further, the approach of the present embodiment may be applied to the pixel configuration of the second or third embodiment.

A voltage at the low level that is applied to the gate of the reset transistor M3 in periods other than the row readout period may be the power supply voltage VRESL1, the power supply voltage VRESL2, or other power supply voltages including the GND level.

As described above, according to the present embodiment, the clipping level for the pixel output lines is changed depending on how many times charges are transferred from the photoelectric converters to the holding portions. As a result, similar to the first embodiment, the influence on the characteristics of pixel signals in adjacent columns, which occurs when luminance is high, can be prevented, and image quality can thus be improved.

Fifth Embodiment

Figure 12:
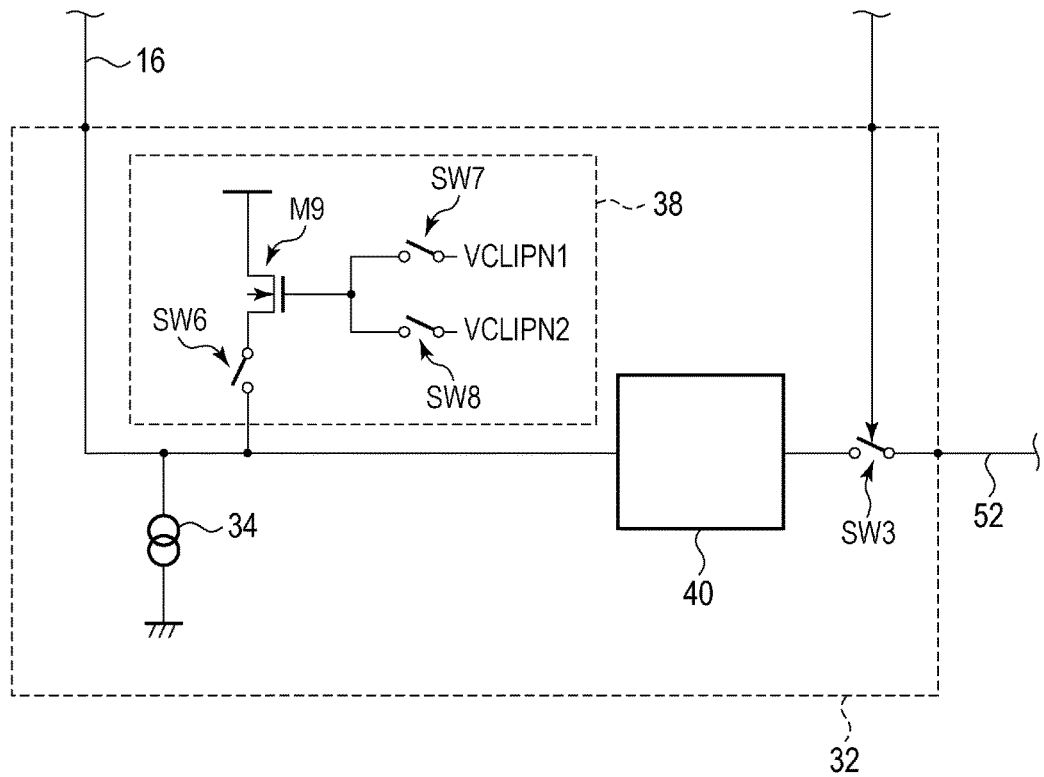
FIG. 12 is a circuit diagram for illustrating a configuration example of a column readout circuit of a solid-state imaging device according to a fifth embodiment of the present invention.
Figure 13:
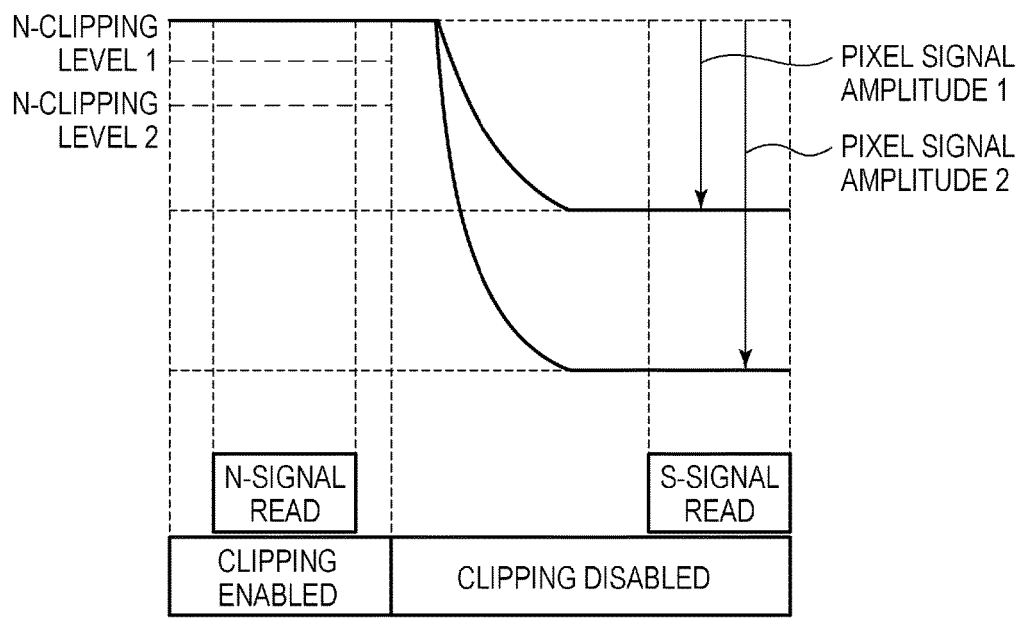
FIG. 13 is an explanatory diagram of the operation of a clipping circuit of the solid-state imaging device according to the fifth embodiment of the present invention.

A solid-state imaging device and a method of driving the solid-state imaging device according to a fifth embodiment of the present invention will be described with reference to FIG. 12 and FIG. 13. FIG. 12 is a diagram for illustrating a configuration example of a readout circuit of the solid-state imaging device according to the present embodiment. FIG. 13 is an explanatory diagram of the operation of a clipping circuit of the solid-state imaging device according to the present embodiment. The same components as those of the solid-state imaging devices according to the first to fourth embodiments illustrated in FIG. 1 to FIG. 11 are denoted by like reference symbols, and descriptions thereof are omitted or simplified.

The solid-state imaging device according to the present embodiment is similar to the solid-state imaging device according to the first embodiment illustrated in FIG. and FIG. 2 except for the configuration of the column readout circuit 32. Specifically, the solid-state imaging device according to the present embodiment includes, as illustrated in FIG. 12, a clipping circuit 38 instead of the clipping circuit 36 of the solid-state imaging device of the first embodiment.

The clipping circuit 38 includes a clipping transistor M9 and select switches SW6, SW7, and SW8. A drain of the clipping transistor M9 is connected to the power supply voltage line. A source of the clipping transistor M9 is connected to the pixel output line 16 via the select switch SW6. One main node of the select switch SW7 and one main node of the select switch SW8 are connected to a gate of the clipping transistor M9. The other main node of the select switch SW7 is supplied with a reference voltage VCLIPN1 having any value. Further, the other main node of the select switch SW8 is supplied with a reference voltage VCLIPN2 having any value.

In the example illustrated in FIG. 12, in order to make it easier to understand the function of the clipping circuit 38, the gate of the clipping transistor M9 is supplied with the two types of reference voltages VCLIPN1 and VCLIPN2 via the different select switches SW7 and SW8. The gate of the clipping transistor M9 may be supplied with the reference voltage VCLIPN1 or the reference voltage VCLIPN2 output from a variable voltage source, via one select switch.

FIG. 13 is a diagram for illustrating a relationship between the level of the pixel output line 16 and clipping levels. In the present embodiment, in an N-signal read that is performed after the node VFD is reset, the signal level of the pixel output line 16 is limited by the clipping circuit 38.

When luminance is high, and particularly when the solid-state imaging device is irradiated with sunlight or such extremely strong light, charges that are overflowed from the photoelectric converters PD or the holding portions C1 sometimes greatly influence a reference signal level that corresponds to a state in which the node VFD is reset. When the reference signal level significantly changes, a signal amplitude after correlated double sampling, which is performed in the readout circuit 30 or the signal output unit 60 in the subsequent stage, reduces, leading to a phenomenon called blocked up shadows or blackening.

Further, when charges are transferred from the photoelectric converters PD to the holding portions C1 a plurality of times in an exposure period, a risk that charges that are overflowed from the photoelectric converters PD or the holding portions C1 leak into the holding portions C2 is higher as compared to a case where charges are transferred at one time. It is accordingly desired that the reference signal level be limited depending on how many times charges are transferred from the photoelectric converters PD to the holding portions C1.

In view of the foregoing, in the present embodiment, in an N-signal read, the lower limit of the reference signal level is limited to a predetermined signal level corresponding to the frequency at which charges are transferred from the photoelectric converters PD to the holding portions C1 in an exposure period.

In FIG. 13, an N-clipping level 1 and an N-clipping level 2 represent the optimum limit levels for reference signals for exposure periods in which charges are transferred from the photoelectric converters PD to the holding portions C1 at different frequencies. The N-clipping level 1 and the N-clipping level 2 can be set by supplying the predetermined reference voltages VCLIPN1 and VCLIPN2 to the gate of the clipping transistor M9 of the clipping circuit 38 via the select switches SW7 and SW8.

For example, in the driving example of FIG. 4, the limit level for the pixel output line 16 is set to the N-clipping level 2 in an N-signal read in the first readout period, and the limit level for the pixel output line 16 is set to the N-clipping level 1 in an N-signal read in the second readout period. Those values can be set to any value in the drive signal generation unit 70. In an S-signal read, the select switch SW6 is turned off so that the clipping circuit 38 can be separated from the pixel output line 16.

In the driving example of the present embodiment, only the lower limit of the reference signal level is limited, but the lower limit of the pixel signal level may be limited as well by combining the present embodiment with the first to fourth embodiments.

As described above, according to the present embodiment, the clipping level for the pixel output lines is changed depending on how many times charges are transferred from the photoelectric converters to the holding portions. As a result, similar to the first embodiment, the influence on the characteristics of pixel signals in adjacent columns, which occurs when luminance is high, can be prevented, and image quality can thus be improved.

Sixth Embodiment

Figure 14:
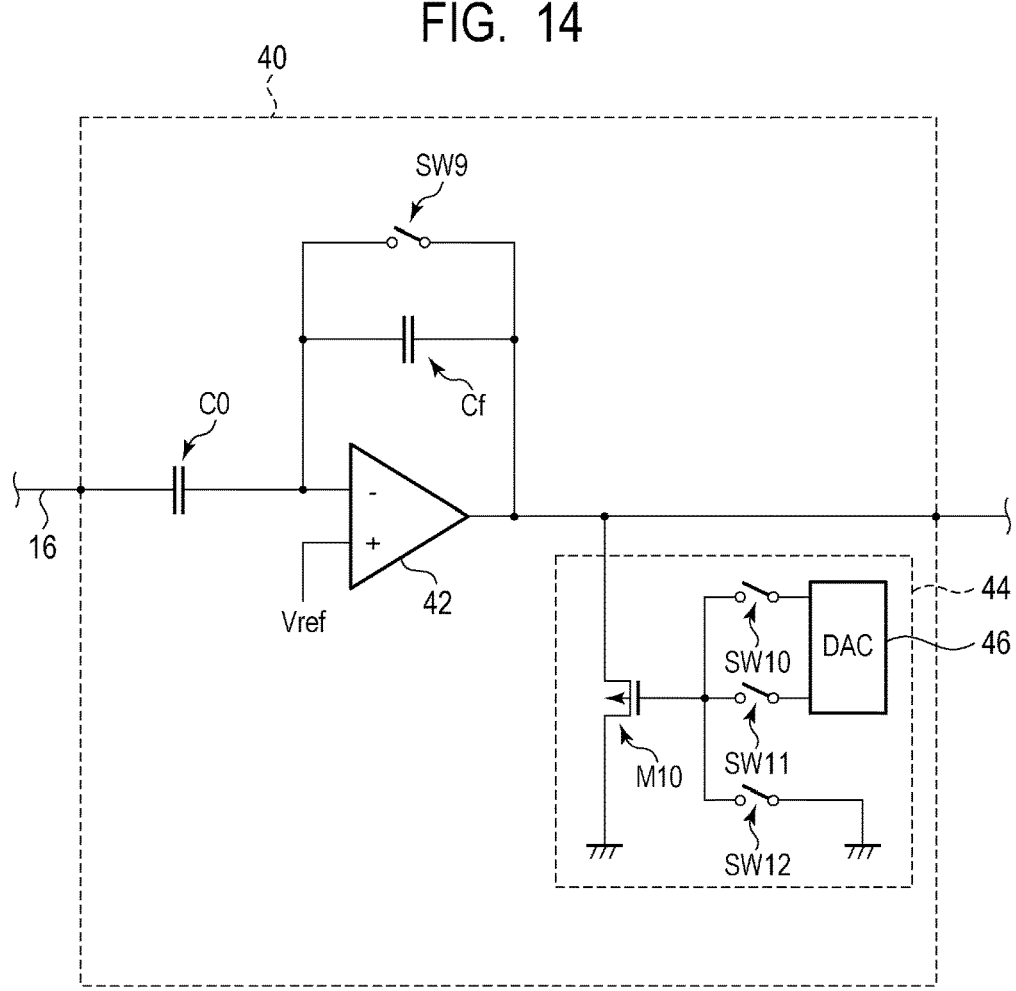
FIG. 14 is a circuit diagram for illustrating a configuration example of a signal processing unit of a solid-state imaging device according to a sixth embodiment of the present invention.
Figure 15:
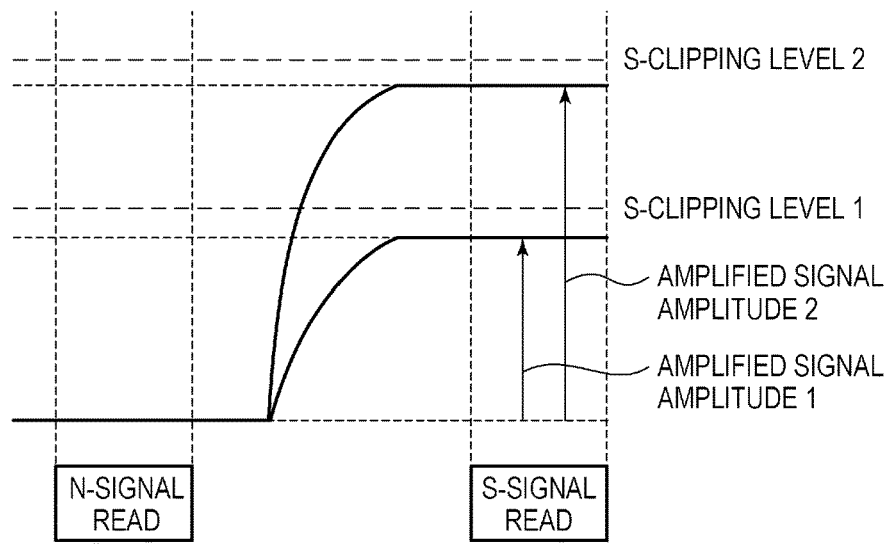
FIG. 15 is an explanatory diagram of the operation of a clipping circuit of the solid-state imaging device according to the sixth embodiment of the present invention.

A solid-state imaging device and a method of driving the solid-state imaging device according to a sixth embodiment of the present invention will be described with reference to FIG. 14 and FIG. 15. FIG. 14 is a circuit diagram for illustrating a configuration example of a signal processing unit of the solid-state imaging device according to the present embodiment. FIG. 15 is an explanatory diagram of the operation of a clipping circuit of the solid-state imaging device according to the present embodiment. The same components as those of the solid-state imaging devices according to the first to fifth embodiments illustrated in FIG. 1 to FIG. 13 are denoted by like reference symbols, and descriptions thereof are omitted or simplified.

In the present embodiment, the solid-state imaging device capable of limiting the signal level of output signals in the signal processing unit 40 of the column readout circuit 32, and the method of driving the solid-state imaging device are described.

The solid-state imaging device according to the present embodiment is similar to the solid-state imaging device according to the first embodiment illustrated in FIG. 1 to FIG. 3 except that the signal processing unit 40 of the column readout circuit 32 includes a circuit illustrated in FIG. 14.

The signal processing unit 40 of the solid-state imaging device according to the present embodiment includes, as illustrated in FIG. 14, an amplifier circuit including an operational amplifier 42, an input capacitor C0, a feedback capacitor Cf, and a reset switch SW9, and a clipping circuit 44.

The pixel output line 16 is connected to an inverting input terminal of the operational amplifier 42 via the input capacitor C0. A non-inverting input terminal of the operational amplifier 42 is supplied with a reference voltage Vref. The feedback capacitor Cf and the reset switch SW9 are connected in parallel to each other between the inverting input terminal and an output terminal of the operational amplifier 42. In this way, a switched capacitor inverting amplifier is formed. The clipping circuit 44 is connected to the output terminal of the operational amplifier 42, which is also an output node of the signal processing unit 40.

The clipping circuit 44 includes a clipping transistor M10, a DAC 46, and select switches SW10, SW11, and SW12. A drain of the clipping transistor M10 is connected to the ground voltage line GND. A source of the clipping transistor M10 is connected to the output terminal of the operational amplifier 42. To a gate of the clipping transistor M10, the DAC 46 is connected via the select switches SW10 and SW11, and the GND line is connected via the select switch SW12.

With this configuration, the gate of the clipping transistor M10 can be supplied with one of any two or more types of voltages supplied from the DAC 46 and a voltage at the GND level through selection with the select switches SW10, SW11, and SW12. The basic operation of the clipping circuit 44 is similar to that of the clipping circuit 36.

In the example illustrated in FIG. 14, in order to make it easier to understand the function of the clipping circuit 44, the gate of the clipping transistor M10 is supplied with the three types of voltages including the voltage at the GND level via the different select switches SW10, SW11, and SW12. The mode of supplying the reference voltage to the gate of the clipping transistor M10 is not limited to this example.

Pixel signals input from the pixel output line 16 to the signal processing unit 40 are inversely amplified by a gain that is determined based on a ratio between the input capacitor C0 and the feedback capacitor Cf, and are output from the output terminal of the operational amplifier 42.

FIG. 15 is a diagram for illustrating a relationship between the level of the output terminal of the operational amplifier 42 and clipping levels. After an N-signal read, charges are transferred from the holding portion C1 to the holding portion C2, and the level of the output terminal of the operational amplifier 42 thus rises from a reset level to a signal level corresponding to the amount of transferred charges. In FIG. 15, there are illustrated a case where a pixel signal at a level corresponding to an amplified signal amplitude 1 is read out, and a case where a pixel signal at a level corresponding to an amplified signal amplitude 2 is read out.

In FIG. 15, the S-clipping level 1 and the S-clipping level 2 represent the optimum amplified signal amplitude limit level for the amplified signal amplitude 1 and the optimum amplified signal amplitude limit level for the amplified signal amplitude 2, respectively. The S-clipping level 1 and the S-clipping level 2 can be set by supplying a predetermined reference voltage to the gate of the clipping transistor M10 of the clipping circuit 44. The level of the reference voltage that is supplied to the gate of the clipping transistor M10 can be set to any value in the drive signal generation unit 70. When two types of clipping voltages that are supplied from the DAC 46 are represented by VCLIPCA1 and VCLIPCA2, the clipping voltage VCLIPCA1 corresponds to the S-clipping level 1 and the clipping voltage VCLIPCA2 corresponds to the S-clipping level 2. Here, the potentials of the two clipping voltages satisfy the relationship of VCLIPCA1<VCLIPCA2, and an amplified signal amplitude can be limited to a lower level with the clipping voltage VCLIPCA1.

In the example of the present embodiment, only the S-clipping level in an S-signal read for an amplified signal amplitude is changed, but the N-clipping level in an N-signal read can be changed in a similar manner. For example, the clipping level in an N-signal read can be limited to a lower level with the voltage at the GND level by supplying, from the clipping circuit 44, the clipping voltage VCLIPCA1 and the voltage at the GND level that satisfy VCLIPCA1>GND level.

As described above, according to the present embodiment, the clipping level for the output terminals of the signal processing units is changed depending on how many times charges are transferred from the photoelectric converters to the holding portions. As a result, similar to the first embodiment, the influence on the characteristics of pixel signals in adjacent columns, which occurs when luminance is high, can be prevented, and image quality can thus be improved.

Seventh Embodiment

Figure 16:
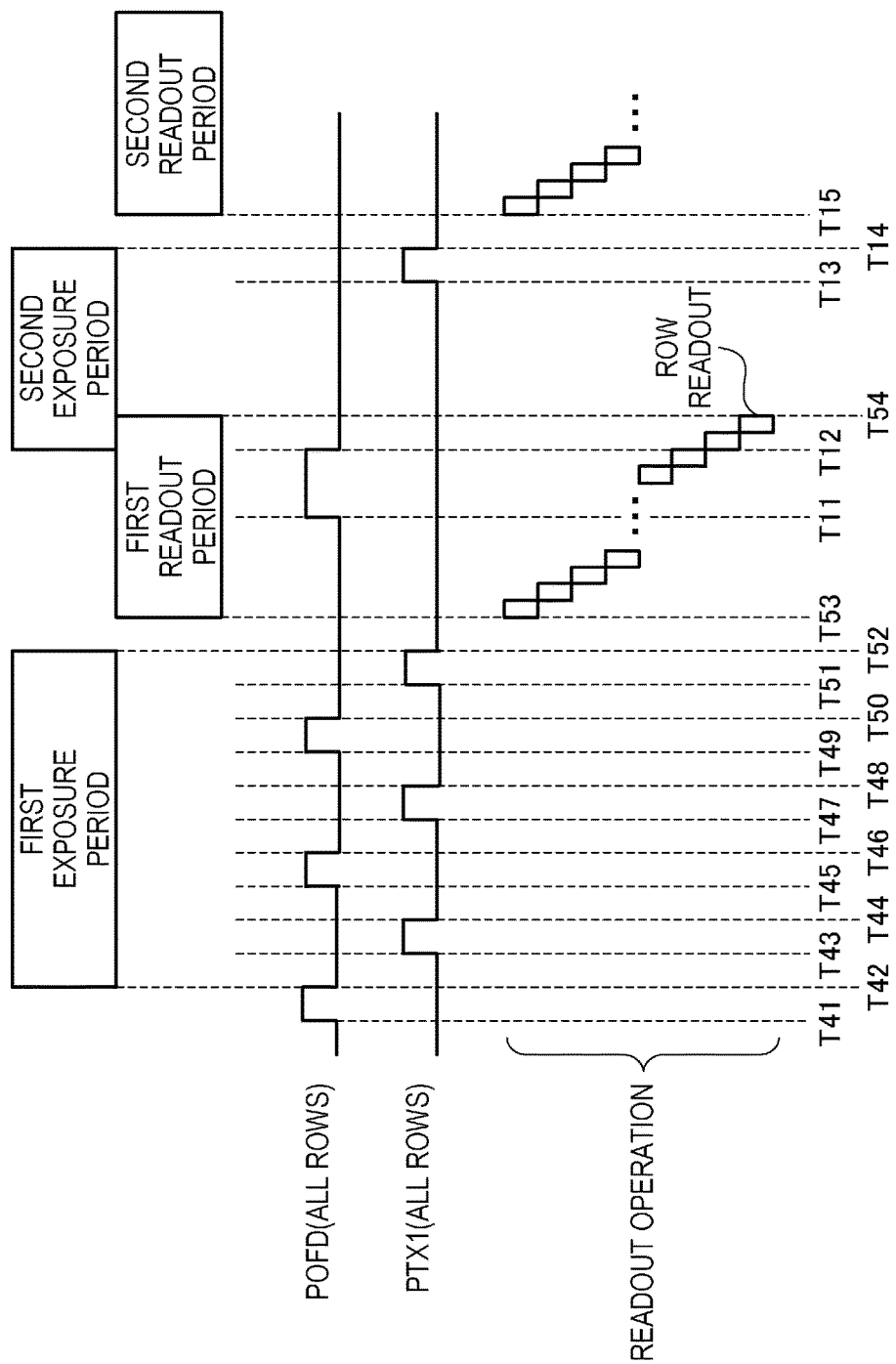
FIG. 16 is a timing chart for illustrating a method of driving a solid-state imaging device according to a seventh embodiment of the present invention.

A method of driving a solid-state imaging device according to a seventh embodiment of the present invention will be described with reference to FIG. 16. FIG. 16 is a timing chart for illustrating the method of driving the solid-state imaging device according to the present embodiment. The same components as those of the solid-state imaging devices according to the first to sixth embodiments illustrated in FIG. 1 to FIG. 15 are denoted by like reference symbols, and descriptions thereof are omitted or simplified.

In the present embodiment, another method of driving the solid-state imaging device according to the first embodiment is described. The driving method according to the present embodiment differs from the driving method of the first embodiment in that the drive signal POFD and the drive signal PTX1 are alternately set to the high level in a repetitive manner in the first exposure period.

In a period from time T41 to time T42, the drive signals POFD that are supplied from the pixel driving unit 20 to the signal lines OFD in all rows transition to the high level, and the photoelectric converters PD are reset to a potential corresponding to the power supply voltage. At time T42, the drive signals POFD transition to the low level and the reset transistors M4 are thus turned off, with the result that the first exposure period starts.

Next, in a period from time T43 to time T44, the drive signals PTX1 that are supplied from the pixel driving unit 20 to the signal lines TX1 in all rows transition to the high level, and the transfer transistors M1 are thus turned on. Consequently, charges generated in the photoelectric converters PD in the period from time T42 to time T44 are transferred to the holding portions C1.

In a similar manner, the reset transistors M4 are turned on in a period from time T45 to time T46, and the transfer transistors M1 are turned on in a period from time T47 to time T48 so that charges generated in the photoelectric converters PD in the period from time T46 to time T48 are transferred to the holding portions C1. Further, the reset transistors M4 are turned on in a period from time T49 to time T50, and the transfer transistors M1 are turned on in a period from time T51 to time T52 so that charges generated in the photoelectric converters PD in the period from time T50 to time T52 are transferred to the holding portions C1. The charges transferred to the holding portions C1 through the three times transfer processing are accumulated in the holding portions C1.

The charges that are transferred to the holding portions C1 by time T52 to be held in the holding portions C1 are sequentially read out for each row in the first readout period that starts at time T53. At time T54, readout is complete for all rows, and the first readout period ends.

As described above, in the driving method according to the present embodiment, in driving of transferring charges from the photoelectric converters PD to the holding portions C1 a plurality of times in an exposure period, the photoelectric converters PD are reset every transfer of charges. With this driving, accumulation periods can be dispersed and the amount of charges that are transferred to the holding portions C1 can be reduced. Such driving can be applied to the case of taking high dynamic range (HDR) photos or taking photos while preventing flicker.

The above-mentioned effect provided by the solid-state imaging device according to the first embodiment can be similarly achieved by the solid-state imaging device according to the present embodiment.

Eighth Embodiment

Figure 17:
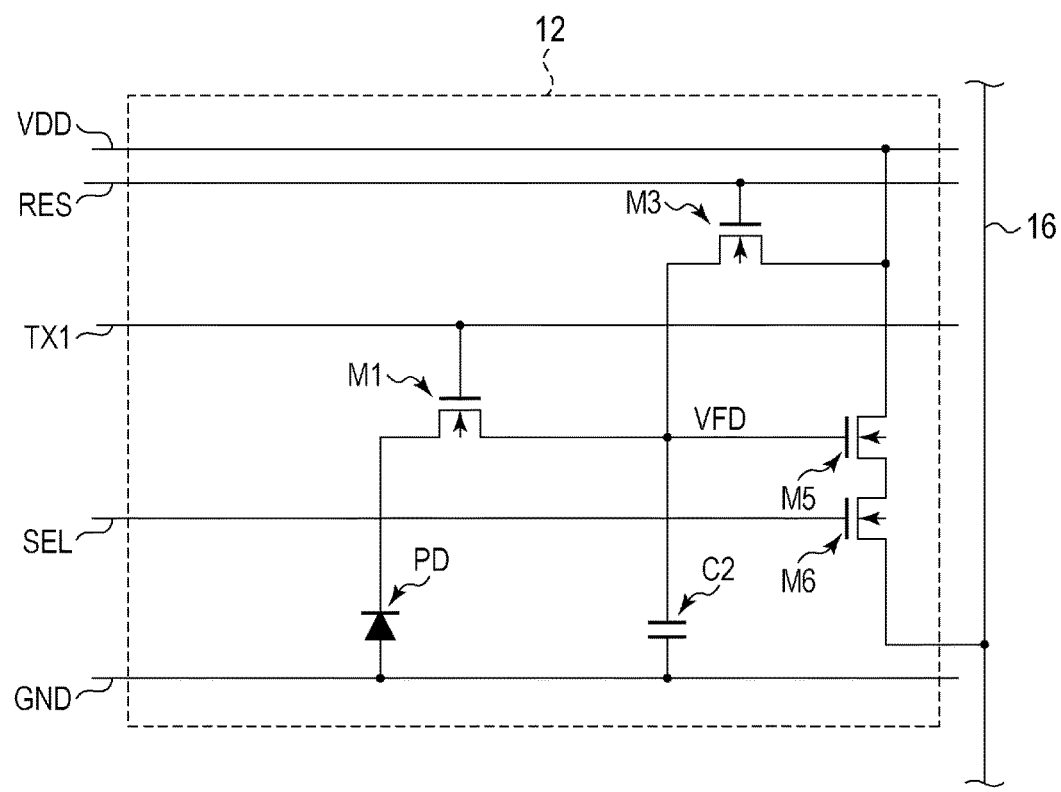
FIG. 17 is a circuit diagram for illustrating a configuration example of a pixel of a solid-state imaging device according to an eighth embodiment of the present invention.
Figure 18:
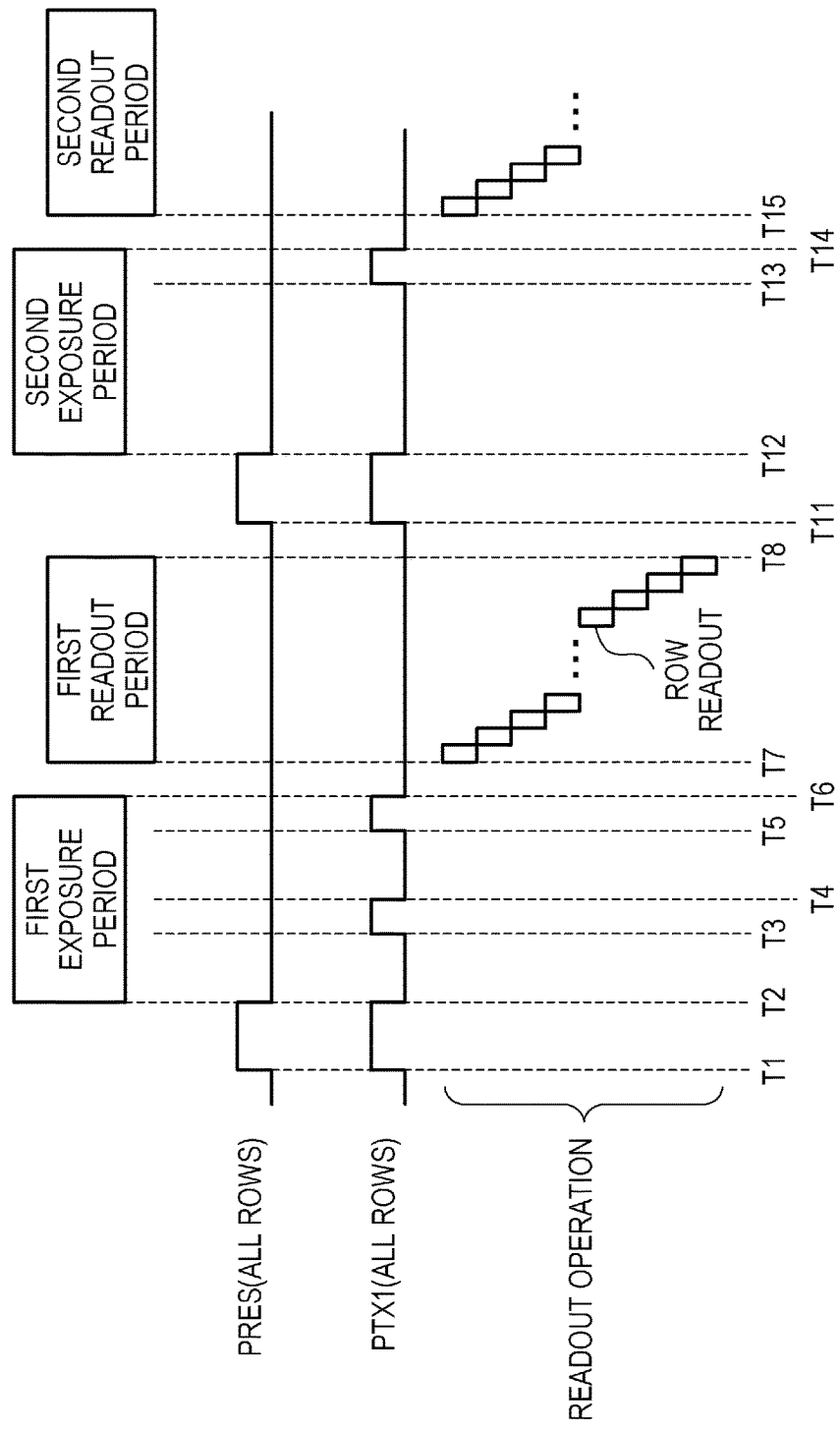
FIG. 18 and FIG. 19 are timing charts for illustrating a method of driving the solid-state imaging device according to the eighth embodiment of the present invention.
Figure 19:
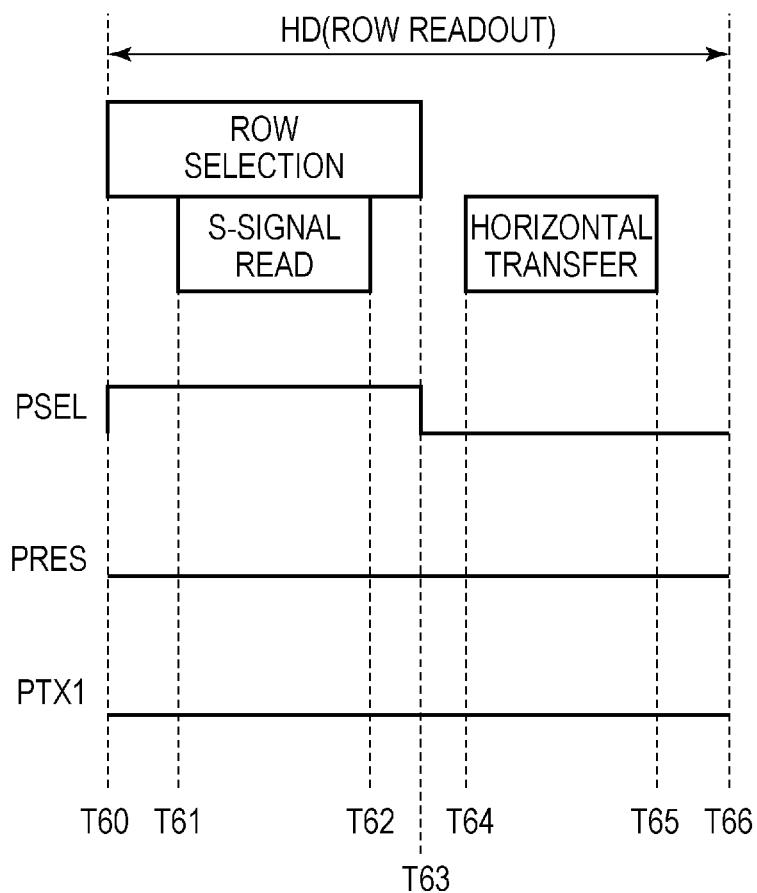

A solid-state imaging device and a method of driving the solid-state imaging device according to an eighth embodiment of the present invention will be described with reference to FIG. 17 to FIG. 19. FIG. 17 is a circuit diagram for illustrating a configuration example of a pixel of the solid-state imaging device according to the present embodiment. FIG. 18 and FIG. 19 are timing charts for illustrating the method of driving the solid-state imaging device according to the present embodiment. The same components as those of the solid-state imaging devices according to the first to seventh embodiments illustrated in FIG. 1 to FIG. 16 are denoted by like reference symbols, and descriptions thereof are omitted or simplified.

The solid-state imaging device according to the present embodiment is similar to the solid-state imaging device according to the first embodiment except for the configuration of the pixel 12. The pixel 12 of the present embodiment differs from the pixel 12 of the first embodiment in that the holding portion C1, the reset transistor M4, and the transfer transistor M2 are not included as illustrated in FIG. 17. The drain of the transfer transistor M1 is directly connected to the node VFD.

Next, the method of driving the solid-state imaging device according to present embodiment is described with reference to FIG. 18 and FIG. 19.

At time T1, the drive signals PRES and the drive signals PTX1 that are respectively supplied from the pixel driving unit 20 to the signal lines RES and the signal lines TX1 in all rows transition from the low level to the high level. Consequently, the reset transistors M3 and the transfer transistors M1 of all of the pixels 12 are turned on. The photoelectric converters PD are thus connected to the power supply voltage line VDD via the reset transistors M3 and the transfer transistors M1, and are reset to a potential corresponding to the power supply voltage.

Next, at time T2, the drive signals PRES that are supplied to the signal lines RES in all rows and the drive signals PTX1 that are supplied to the signal lines TX1 in all rows transition from the high level to the low level, and the reset transistors M3 and the transfer transistors M1 of all of the pixels 12 are turned off. Consequently, in all of the pixels 12, the reset state of the photoelectric converters PD is cancelled, and the first exposure period starts at the same time. At time T2, the first exposure period starts.

Next, in the period from time T2 to time T6 at which the first exposure period ends, the drive signals PTX1 that are supplied to the signal lines TX1 in all rows intermittently transition from the low level to the high level a plurality of times. While the drive signals PTX1 are at the high level, the transfer transistors M1 of the pixels 12 are turned on. Consequently, charges generated and accumulated in the photoelectric converters PD are transferred from the photoelectric converters PD to the holding portions C2 in the period in which the transfer transistors M1 are turned on. At a timing at which the drive signals PTX1 transition from the high level to the low level in the last transfer operation, the first exposure period ends (time T6).

Here, the drive signals PTX1 are set to the high level twice in total, that is, in a period from time T3 to time T4 and a period from time T5 to time T6. The transfer transistors M1 are turned on in the period from time T3 to time T4, and charges generated in the photoelectric converters PD in the period from time T2 to time T4 are thus transferred to the holding portions C2. Further, the transfer transistors M1 are turned on in the period from time T5 to time T6, and charges generated in the photoelectric converters PD in the period from time T4 to time T6 are thus transferred to the holding portions C2. As a result, charges generated in the photoelectric converters PD in the period from time T2 to time T6, which corresponds to the first exposure period, are transferred from the photoelectric converters PD to the holding portions C2 to be held in the holding portions C2.

In the example of the present embodiment, the transfer transistors M1 are turned on twice in the first exposure period, but the transfer transistors M1 may be turned on once or three times or more. Further, the interval at which the transfer transistors M1 are turned on is not particularly limited.

Next, in a period from time T7 to time T8, signals based on the charges held in the holding portions C2 are read out (first readout period). In the first readout period, the signals are sequentially read out to the pixel output lines 16 for each row. When pixel signals are read out of the pixels 12 in the last row at time T8, the first readout period ends. During the first readout period, the reference voltage VCLIPS2 is applied to the gates of the clipping transistors M8 via the select switches SW2.

Through this operation, the imaging operation in which the photoelectric converters PD perform the photoelectric conversion operation and accumulation in the same period (first exposure period) among the plurality of pixels 12, that is, the so-called global electronic shutter operation can be performed.

In a similar manner, at time T11 that comes after time T8 at which the first readout period ends, the drive signals PRES and the drive signals PTX1 that are respectively supplied to the signal lines RES and the signal lines TX1 in all rows transition from the low level to the high level. Consequently, the reset transistors M3 and the transfer transistors M1 of all of the pixels 12 are turned on. The photoelectric converters PD are thus connected to the power supply voltage line VDD via the reset transistors M3 and the transfer transistors M1, and are reset to a potential corresponding to the power supply voltage.

Next, at time T12, the drive signals PRES that are supplied to the signal lines RES in all rows and the drive signals PTX1 that are supplied to the signal lines TX1 in all rows transition from the high level to the low level. With this operation, the reset transistors M3 and the transfer transistors M1 of all of the pixels 12 are turned off. Consequently, the reset state of the photoelectric converters PD is cancelled, and the second exposure period starts at the same time.

Next, in the period from time T12 to time T14 at which the second exposure period ends, the drive signals PTX1 that are supplied to the signal lines TX1 in all rows transition from the low level to the high level once. While the drive signals PTX1 are at the high level, the transfer transistors M1 of the pixels 12 are turned on. Consequently, charges generated and accumulated in the photoelectric converters PD are transferred from the photoelectric converters PD to the holding portions C2 in the period in which the transfer transistors M1 are turned on.

Here, the drive signals PTX1 are set to the high level in a period from time T13 to time T14. The transfer transistors M1 are turned on in the period from time T13 to time T14, and charges generated in the photoelectric converters PD in the period from time T12 to time T14 are thus transferred to the holding portions C2.

In the example of the present embodiment, the transfer transistors M1 are turned on once in the second exposure period, but the transfer transistors M1 may be turned on twice or more. Further, the interval at which the transfer transistors M1 are turned on is not particularly limited.

Next, after the second exposure period ends, similar to the first readout period, signals based on the charges held in the holding portions C2 are read out (second readout period).

During the second readout period, the reference voltage VCLIPS1 is applied to the gates of the clipping transistors M8 via the select switches SW1.

Next, with reference to FIG. 19, the details of the readout operation for each row are described. Here, of the plurality of rows belonging to the pixel array 10, the readout operation of the pixels 12 in an n-th row is described as an example.

At time T60, the drive signal PSEL that is supplied from the pixel driving unit 20 to the signal line SEL in the n-th row transitions from the low level to the high level, and the select transistors M6 of the pixels 12 in the n-th row are thus turned on. Consequently, the pixels 12 in the n-th row are selected.

At this time, the nodes VFD are set to a potential corresponding to the amount of charges that are held in the holding portions C2, through charge voltage conversion by the capacitors of the holding portions C2. As a result, pixel signals (S-signals) corresponding to the amount of charges that are held in the holding portions C2 are output to the pixel output lines 16 (S-signal read).

The above-mentioned effect provided by the solid-state imaging device according to the first embodiment can be similarly achieved by the solid-state imaging device according to the present embodiment.

Ninth Embodiment

Figure 20:
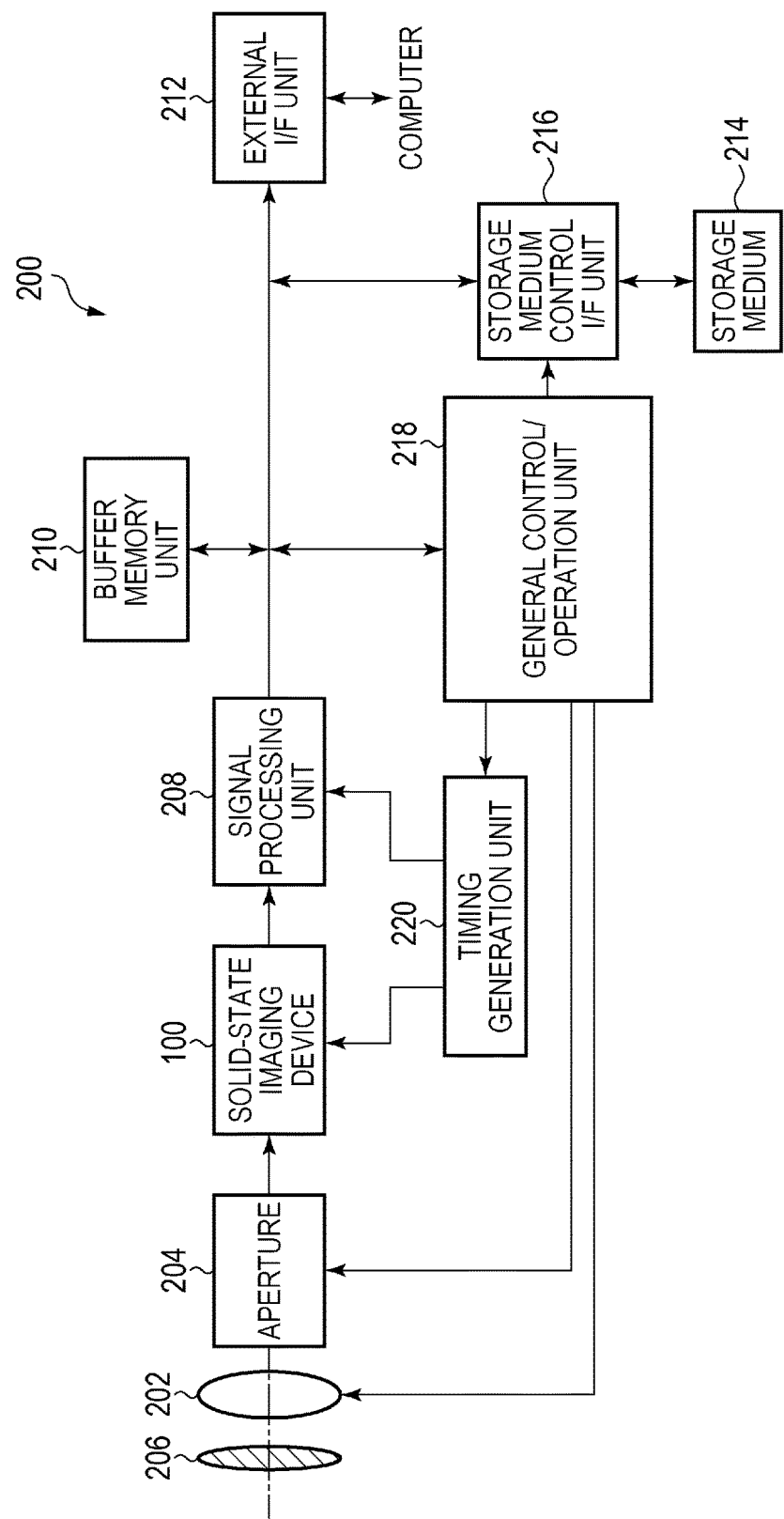
FIG. 20 is a block diagram for illustrating the schematic configuration of an imaging system according to a ninth embodiment of the present invention.

An imaging system according to a ninth embodiment of the present invention is described with reference to FIG. 20. FIG. 20 is a block diagram for illustrating a configuration of the imaging system according to the present embodiment. The same components as those of the solid-state imaging devices according to the first to eighth embodiments illustrated in FIG. 1 to FIG. 19 are denoted by like reference symbols, and descriptions thereof are omitted or simplified.

The solid-state imaging device described in the above-mentioned first to eighth embodiments can be applied to various imaging systems. As imaging systems to which the solid-state imaging device can be applied, for example, digital still cameras, digital camcorders, and monitoring cameras are given. FIG. 20 is an illustration of a digital still camera to which the solid-state imaging device described in the above-mentioned embodiments is applied.

An imaging system 200 exemplified in FIG. 20 includes the solid-state imaging device 100, a lens 202 configured to form an optical image of an object onto the solid-state imaging device 100, an aperture 204 configured to make an amount of light passing through the lens 202 variable, and a barrier 206 configured to protect the lens 202. The lens 202 and the aperture 204 form an optical system configured to condense light onto the solid-state imaging device 100. The solid-state imaging device 100 corresponds to the solid-state imaging device 100 described in each of the first to eighth embodiments.

The imaging system 200 further includes a signal processing unit 208 configured to process output signals output from the solid-state imaging device 100. The signal processing unit 208 is further configured to conduct various kinds of correction processing and compression processing as the need arises, and to conduct an operation for outputting the signal. The signal processing unit 208 may have a function to perform AD conversion processing on output signals output from the solid-state imaging device 100. In this case, the column readout circuit 32 of the solid-state imaging device 100 does not necessarily include an AD conversion circuit.

The imaging system 200 further includes a buffer memory unit 210 configured to temporarily store the image data and an external interface unit (external I/F unit) 212 configured to communicate to/from an external computer or the like. The imaging system 200 further includes a storage medium 214, for example, a semiconductor memory, configured to record or read out imaging data and a storage medium control interface unit (storage medium control I/F unit) 216 configured to record or read out data on the storage medium 214. The storage medium 214 may be built into the imaging system 200, or may be removably mounted thereto.

The imaging system 200 further includes a general control/operation unit 218 configured to control execution of various arithmetic operations and the entire digital still camera and a timing generation unit 220 configured to output various timing signals to the solid-state imaging device 100 and the signal processing unit 208. In this case, the timing signal or the like may be input from the outside, and it suffices that the imaging system 200 includes at least the solid-state imaging device 100 and the signal processing unit 208 configured to process the output signals output from the solid-state imaging device 100. The general control/operation unit 218 and the timing generation unit 220 may be configured to achieve all or part of the functions of the drive signal generation unit 70 and other units (for example, the function of the transfer control unit or the clipping level control unit) of the solid-state imaging device 100.

The solid-state imaging device 100 is configured to output image signals to the signal processing unit 208. The signal processing unit 208 is configured to perform predetermined signal processing on image signals output from the solid-state imaging device 100, thereby outputting image data. The signal processing unit 208 is further configured to generate images using image signals.

When the solid-state imaging device 100 according to the first to eighth embodiments is applied to an imaging system, an imaging system capable of obtaining higher quality images can be achieved.

Tenth Embodiment

Figure 21A:
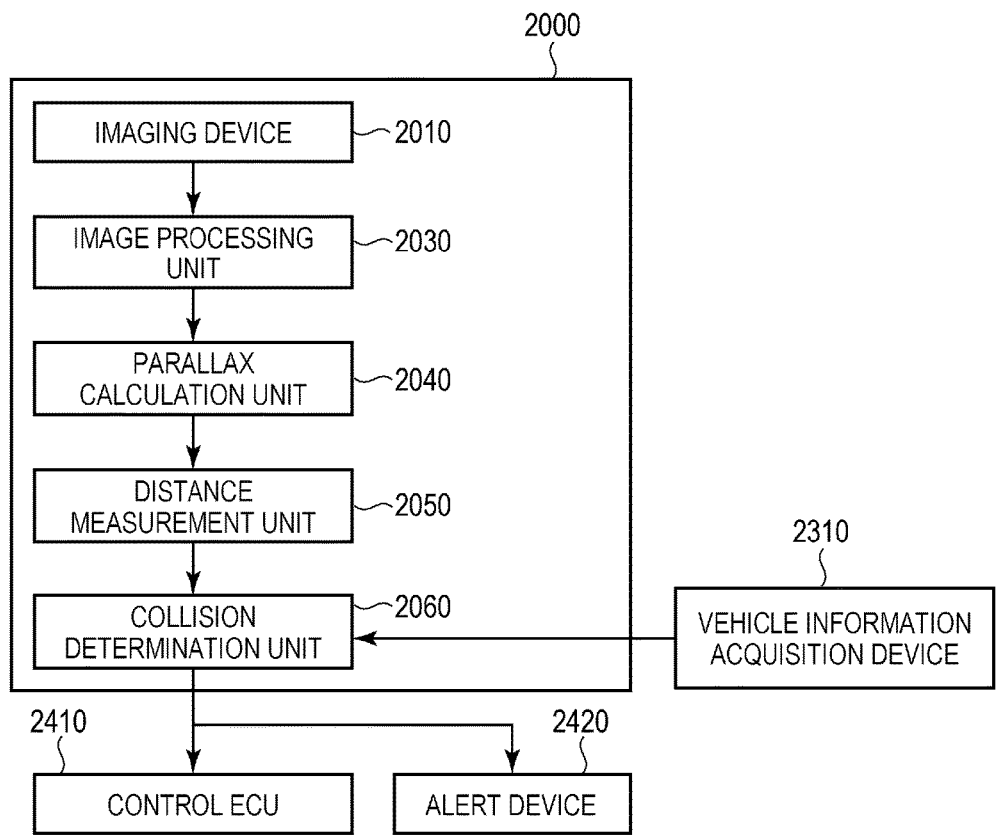
FIG. 21A is a diagram for illustrating the configuration of an imaging system according to a tenth embodiment of the present invention.
Figure 21B:
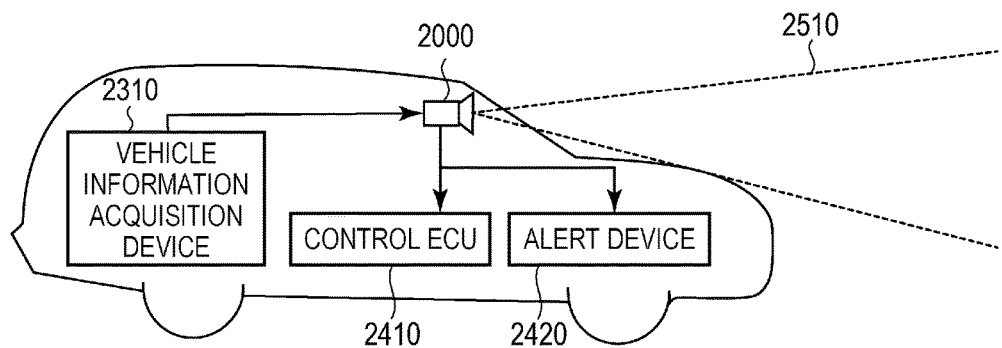
FIG. 21B is a diagram for illustrating the configuration of a movable object according to the tenth embodiment of the present invention.

An imaging system and a movable object according to a tenth embodiment of the present invention are described with reference to FIG. 21A and FIG. 21B. FIG. 21A is a diagram for illustrating the configuration of the imaging system according to the present embodiment. FIG. 21B is a diagram for illustrating the configuration of the movable object according to the present embodiment.

FIG. 21A is an illustration of an example of the imaging system relating to an on-vehicle camera. An imaging system 2000 includes an imaging device 2010. The imaging device 2010 corresponds to the solid-state imaging device described above in any one of the first to eighth embodiments. The imaging system 2000 further includes an image processing unit 2030 configured to conduct image processing on a plurality of pieces of image data acquired by the imaging device 2010 and a parallax calculation unit 2040 configured to calculate a parallax (phase difference of a parallax image) from the plurality of pieces of image data acquired by the imaging system 2000. The imaging system 2000 further includes a distance measurement unit 2050 configured to calculate a distance from a target object based on the calculated parallax and a collision determination unit 2060 configured to determine whether or not there is a possibility of a collision based on the calculated distance. In this case, the parallax calculation unit 2040 and the distance measurement unit 2050 are merely examples of a distance information acquisition unit configured to acquire distance information from the target object. That is, the distance information represents information relating to the parallax, a defocus amount, the distance from the target object, and the like. The collision determination unit 2060 may determine whether or not there is a possibility of a collision through use of any one of those pieces of distance information. The distance information acquisition unit may be achieved by exclusively designed hardware, or may be achieved by a software module. The distance information acquisition unit may also be achieved by a field programmable gate array (FPGA), an application specific integrated circuit (ASIC), or the like, or may be achieved by a combination thereof.

The imaging system 2000 is connected to a vehicle information acquisition device 2310, and is capable of acquiring vehicle information including a vehicle speed, a yaw rate, and a steering angle. The imaging system 2000 is further connected to a control ECU 2410 being a control device configured to output a control signal for generating a braking force for a vehicle based on a determination result obtained by the collision determination unit 2060. The imaging system 2000 is further connected to an alert device 2420 configured to issue an alert to a driver based on the determination result obtained by the collision determination unit 2060. For example, when it is determined that the possibility of a collision is high based on the determination result obtained by the collision determination unit 2060, the control ECU 2410 controls the vehicle to avoid the collision and reduce damage if a collision occurs by, for example, braking, easing an accelerator, or suppressing engine output. The alert device 2420 warns a user by, for example, emitting sound or the like of the alert, displaying alert information on a screen of a car navigation system, or applying vibrations to a seat belt or a steering wheel.

In the present embodiment, an image around the vehicle, for example, an image of a front or a rear of the vehicle is taken by the imaging system 2000. FIG. 21B is an illustration of an imaging system being used to take the image of the front (imaging range 2510) of the vehicle. The example of controlling the vehicle so as not to collide with another vehicle has been described above, but the present embodiment may be applied to, for example, control for automatic driving conducted so as to follow another vehicle or control for automatic driving conducted so as not to deviate from a lane. Moreover, the imaging system can be applied not only to the vehicle including the own vehicle but also to the movable object (movable apparatus), for example, a vessel, an aircraft, or an industrial robot. In addition to the movable object, the imaging system can be widely applied to devices that use object recognition, for example, an intelligent transportation system (ITS).

Modification Embodiment

The present invention is not limited to the above-mentioned embodiments, and various modifications can be made thereto.

For example, the present invention includes, as its embodiment, an example in which part of the configuration of any of the embodiments is added to another embodiment or is replaced with part of the configuration of another embodiment.

Further, in the cases of the above-mentioned embodiments, the solid-state imaging device is driven with a global electronic shutter, but the present invention can also be applied in a similar manner to a solid-state imaging device that is driven with a rolling electronic shutter.

Further, in the above-mentioned embodiments, description is given on the assumption that the transistors of the pixel 12 are n-channel transistors, but the transistors of the pixel 12 may be p-channel transistors. In this case, the signal level of each drive signal in the above description is inverted.

Further, in the examples of the above-mentioned embodiments, the ratio of the saturation charge amounts of the photoelectric converter PD and the holding portion C1 is 1:2, and charges are transferred from the photoelectric converters PD to the holding portions C1 twice in an exposure period. However, those values and combinations are not limited to the examples of the above-mentioned embodiments.

Further, the imaging systems according to the ninth embodiment and the tenth embodiment are examples of imaging systems to which the solid-state imaging device of the present invention is applicable, and the imaging systems to which the solid-state imaging device of the present invention is applicable are not limited to the configuration illustrated in FIG. 20.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-181283, filed Sep. 16, 2016 which is hereby incorporated by reference herein in its entirety.

What is claimed is:

1. A solid-state imaging device comprising:
  a plurality of pixels each including
    a photoelectric converter configured to generate charges through photoelectric conversion,
    a holding portion configured to hold charges generated in the photoelectric converter, and
    a transfer unit configured to transfer charges from the photoelectric converter to the holding portion,
  the plurality of pixels each being configured to output a signal based on charges held in the holding portion;
  an output line, which is connected to the plurality of pixels, and to which the signal is output from each of the plurality of pixels;
  a clipping unit configured to limit a signal level of the signal so that the signal level falls within a range having an upper limit and a lower limit, one of which is determined by a clipping level;
  a transfer control unit configured to control the transfer unit so that the charges generated in the photoelectric converter during one exposure period are transferred to the holding portion through transfer operation performed at a frequency that is variable but at least once; and
  a clipping level control unit configured to control the clipping level so that the clipping level is set to a first clipping level when the transfer operation is performed at a first frequency, and the clipping level is set to a second clipping level that is different from the first clipping level when the transfer operation is performed at a second frequency that is different from the first frequency.

2. The solid-state imaging device according to claim 1, wherein the clipping unit is configured to limit a signal level of the output line.

3. The solid-state imaging device according to claim 2,
  wherein the clipping unit includes a clipping transistor connected to the output line, and
  wherein the clipping level control unit is configured to control the clipping level with a gate voltage of the clipping transistor.

4. The solid-state imaging device according to claim 1,
  wherein the plurality of pixels each further include an amplifier portion configured to amplify a signal corresponding to an amount of the charges held in the holding portion,
  wherein the clipping unit includes a reset transistor configured to reset a potential of an input node of the amplifier portion, and
  wherein the clipping level control unit is configured to control the clipping level with a gate voltage of the reset transistor.

5. The solid-state imaging device according to claim 1, further comprising an amplifier circuit configured to amplify the signal output to the output line,
  wherein the clipping unit is configured to limit a signal level of an output node of the amplifier circuit.

6. The solid-state imaging device according to claim 1, wherein the clipping unit is configured to narrow a range of the signal level of the signal as the frequency is reduced.

7. The solid-state imaging device according to claim 1,
  wherein the holding portion includes a first holding portion and a second holding portion,
  wherein the transfer unit includes a first transfer transistor configured to transfer the charges from the photoelectric converter to the first holding portion, and a second transfer transistor configured to transfer the charges from the first holding portion to the second holding portion, and
  wherein the frequency comprises a frequency at which the charges are transferred from the photoelectric converter to the first holding portion.

8. The solid-state imaging device according to claim 1, wherein the signal includes a signal based on an amount of the charges generated in the photoelectric converter, and a signal based on a reset level of the holding portion.

9. The solid-state imaging device according to claim 1, wherein the photoelectric converter has a saturation charge amount that is smaller than a saturation charge amount of the holding portion.

10. A method of driving a solid-state imaging device including a plurality of pixels each including a photoelectric converter configured to generate charges through photoelectric conversion, a holding portion configured to hold charges generated in the photoelectric converter, and a transfer unit configured to transfer charges from the photoelectric converter to the holding portion, the plurality of pixels each being configured to output a signal based on the charges held in the holding portion, an output line, which is connected to the plurality of pixels, and to which the signal is output from each of the plurality of pixels, and a clipping unit configured to limit a signal level of the signal so that the signal level falls within a range having an upper limit and a lower limit, one of which is determined by a clipping level, the method comprising:
  transferring charges generated in the photoelectric converter during one exposure period to the holding portion through transfer operation performed at a frequency that is variable but at least once; and
  setting the clipping level so that the clipping level is set to a first clipping level when the transfer operation is performed at a first frequency, and the clipping level is set to a second clipping level that is different from the first clipping level when the transfer operation is performed at a second frequency that is different from the first frequency.

11. The method of driving a solid-state imaging device according to claim 10, wherein a signal level of the output line is limited by the clipping unit.

12. The method of driving a solid-state imaging device according to claim 10,
wherein the plurality of pixels each further include an amplifier portion configured to amplify a signal corresponding to an amount of the charges held in the holding portion, and
wherein the clipping level is controlled with a gate voltage of a reset transistor configured to reset a potential of an input node of the amplifier portion.

13. The method of driving a solid-state imaging device according to claim 10,
wherein the solid-state imaging device further includes an amplifier circuit configured to amplify the signal output to the output line, and
wherein a signal level of an output node of the amplifier circuit is limited by the clipping unit.

14. The method of driving a solid-state imaging device according to claim 10, wherein the clipping level is so set that a range of the signal level of the signal is narrowed as the frequency is reduced.

15. The method of driving a solid-state imaging device according to claim 10, wherein the frequency in a first frame period and the frequency in a second frame period are different from each other.

16. The method of driving a solid-state imaging device according to claim 10,
wherein the plurality of pixels have the same exposure period.

17. An imaging system comprising:
the solid-state imaging device according to claim 1; and
a signal processing unit configured to process the signal output from each of the plurality of pixels of the solid-state imaging device.

18. An imaging system comprising:
a solid-state imaging device including a plurality of pixels each including a photoelectric converter configured to generate charges through photoelectric conversion, a holding portion configured to hold charges generated in the photoelectric converter, and a transfer unit configured to transfer charges from the photoelectric converter to the holding portion, the plurality of pixels each being configured to output a signal based on charges held in the holding portion, an output line, which is connected to the plurality of pixels, and to which the signal is output from each of the plurality of pixels, and a clipping unit configured to limit a signal level of the signal so that the signal level falls within a range having an upper limit and a lower limit, one of which is determined by a clipping level;
a transfer control unit configured to control the transfer unit so that the charges generated in the photoelectric converter during one exposure period are transferred to the holding portion through transfer operation performed at a frequency that is variable but at least once;
a clipping level control unit configured to control the clipping level so that the clipping level is set to a first clipping level when the transfer operation is performed at a first frequency, and the clipping level is set to a second clipping level that is different from the first clipping level when the transfer operation is performed at a second frequency that is different from the first frequency; and
a signal processing unit configured to process the signal output from each of the plurality of pixels of the solid-state imaging device.

19. A movable object comprising:
the solid-state imaging device according to claim 1;
a distance information acquisition unit configured to acquire distance information on a distance to a target object from a parallax image that is based on a signal output from the solid-state imaging device; and
a control unit configured to control the movable object based on the distance information.

* * * * *